US012661939B2

(12) United States Patent
Jain et al.

(10) Patent No.: US 12,661,939 B2
(45) Date of Patent: Jun. 23, 2026

(54) DEVICES AND METHODS FOR SENSING TIRE AND ROAD CONDITIONS

(71) Applicant: TDK Corporation, Tokyo (JP)

(72) Inventors: Ishita Jain, Milpitas, CA (US); John Sze, Saratoga, CA (US)

(73) Assignee: TDK Corporation, Tokyo (JP)

( * ) Notice: Subject to any disclaimer, the term of this patent is extended or adjusted under 35 U.S.C. 154(b) by 386 days.

(21) Appl. No.: 18/379,446

(22) Filed: Oct. 12, 2023

(65) Prior Publication Data

US 2024/0131879 A1      Apr. 25, 2024

Related U.S. Application Data

(60) Provisional application No. 63/379,369, filed on Oct. 13, 2022.

(51) Int. Cl.
*B60C 23/04* (2006.01)
*B60C 23/06* (2006.01)

(52) U.S. Cl.
CPC .......... *B60C 23/0493* (2013.01); *B60C 23/06* (2013.01)

(58) Field of Classification Search
None
See application file for complete search history.

(56) References Cited

U.S. PATENT DOCUMENTS

| 11,865,872 B2 * | 1/2024 | Vivek | ................... B60C 19/088 |
| 11,879,764 B2 * | 1/2024 | Haronian | .............. G01F 23/268 |

FOREIGN PATENT DOCUMENTS

DE        102017207490 A1 * 11/2018  ........... B60C 19/002

* cited by examiner

*Primary Examiner* — Peter J Macchiarolo
*Assistant Examiner* — Jermaine L Jenkins
(74) *Attorney, Agent, or Firm* — Morgan, Lewis & Bockius LLP

(57) ABSTRACT

Systems, devices, and methods are described for sensing tire, vehicle, and/or surface conditions using tire-mounted sensors. An example tire assembly includes a vehicle tire, a substrate adapted to deform in accordance with deformation of the vehicle tire, and a set of conductive liquid sensors coupled to the vehicle tire via the substrate, where an electrical resistance of the set of conductive liquid sensors changes in accordance with deformation of the substrate.

20 Claims, 18 Drawing Sheets

Electrode 114

116-2

116-1

116-3

Electrode 120

Substrate layer 122-2

Substrate layer 122-3

Electrode layers 124

Connector 126

Substrate layer 122-1

Sensor 202

250

252

254

Tire 280

Surface 282

Tire 280

Tire 280

Tire 280

*Contact Pressure*

Free spinning state

Rolling on flat surface

Graph 400

Graph 402

Graph 404

Graph 406

System 500

600

610 Receive sensor signals from one or more sensors mounted adjacent to a wheel of a vehicle 620 Determine a driving condition of the vehicle based on the sensor signals 630 Provide information indicating the driving condition of the vehicle

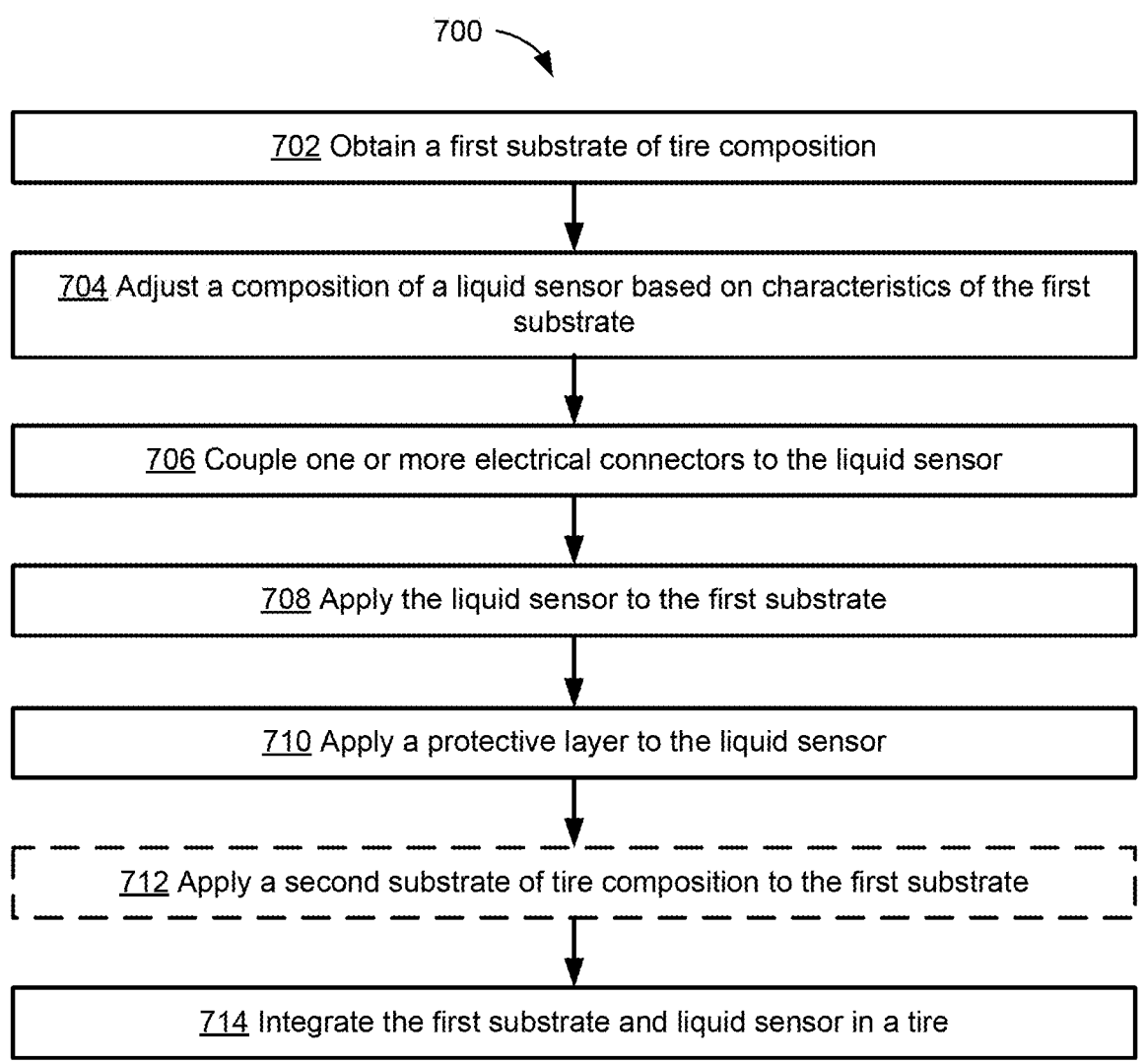

700

702 Obtain a first substrate of tire composition

704 Adjust a composition of a liquid sensor based on characteristics of the first substrate 706 Couple one or more electrical connectors to the liquid sensor 708 Apply the liquid sensor to the first substrate 710 Apply a protective layer to the liquid sensor 712 Apply a second substrate of tire composition to the first substrate 714 Integrate the first substrate and liquid sensor in a tire

752 Obtain a first substrate of elastomer

754 Adjust a composition of a liquid sensor based on characteristics of the first substrate 756 Couple one or more electrical connectors to the liquid sensor 758 Apply the liquid sensor to the first substrate 760 Apply a protective layer to the liquid sensor 764 Mount the first substrate and liquid sensor to a tire

DEVICES AND METHODS FOR SENSING TIRE AND ROAD CONDITIONS

PRIORITY AND RELATED APPLICATIONS

This application claims priority to U.S. Provisional Patent App. Ser. No. 63/379,369, filed Oct. 13, 2022, entitled "Novel Application of Strain-less Liquid Metal Electrode Added to a Highly Bendable and Stretchable Polymer Substrate for Monitoring Pneumatic Tire Performance," which is incorporated by reference herein in its entirety.

TECHNICAL FIELD

This application relates generally to sensor devices, systems, and methods, and more particularly to conductive liquid sensors.

BACKGROUND

Automobiles, bicycles, and other wheeled vehicles are popular means of transportation. Whether used for recreation, commuting, or competition, the vehicle needs to function properly and notify a user of any issues. Accordingly, there is demand for improved safety, response, feedback, and rider analytics. Therefore, monitoring the performance and health of the tires and wheels, as well as the road and surface conditions, is important for riders. However, it can be challenging to mount and operate sensors to perform the monitoring.

SUMMARY

Important health and performance data can include tire behavior, pressure, accelerator, direction, and speed, as well as temperatures and forces (static and dynamic) exerted on the tires, wheels, or vehicle. Sensors mounted to the wheel or tire can accurately measure such health and performance data (e.g., by detecting mechanical strain or deformation). For example, a tire-mounted sensor can provide electrical signals that contain information about the movement and/or deformation of a tire with which the sensor is in contact. Such information can be more accurate than data from sensors mounted on other parts of the vehicle, where the tire and/or road information may need to be estimated based on indirect information. Multiple vehicle systems may rely on the sensor data, such as anti-lock brake systems (ABS), traction control systems (TCS), electronic stability control systems (ECS), and tire pressure monitoring systems (TPMS).

Vehicle stability control systems such as ABS, TCS, ECS, and TPMS require information about tire working conditions such as slippages and forces occurring between the tire and the road surface. However, conventional sensors monitor this crucial information indirectly while mounted on the vehicle frame. Furthermore, current pneumatic tires are passive rubber elements, which do not actively provide tire working conditions and/or forces between tire and the road surface to enhance and/or improve driving stability control. The need for accurate and precise sensor data increases (i) when driving in adverse weather driving conditions such as gusty wind, rain, or snow; and/or (ii) on different road conditions such as wet, muddy, or icy where friction between the tire and the road surface is changing during travel. The tire conditions and road conditions are unpredictable and the changes in condition can be nonlinear. As a result, the grip between the tire and the road can be significantly affected particularly during cornering. Therefore, real-time direct tire-surface contact monitoring enables braking and other vehicle stability control systems to perform on-time reparations in normal and abnormal driving conditions. Additionally, the tire parameters can be optimized to adapt to various driving conditions, road conditions, and tire conditions.

Among other things, the devices and methods described herein address challenges associated with conventional wheel and tire sensors. As an example, tire-surface contact features of a tire can be nonlinear and therefore it can be challenging to apply a correct brake force to stop a vehicle without locking the wheel. Additionally, the grip force depends on tire slip and vertical load, which may not be precisely known in conventional systems. For example, weight shifts between the front and rear wheels depend on the acceleration or deceleration conditions which would limit the amount of traction or break forces that could be applied in the contact patch. Moreover, changes in the tire and road conditions are difficult to accurately predict. Therefore, having information about the deformation of a tire contact patch in real-time driving conditions can greatly improve vehicle stability control.

An example sensor module described herein includes a conductive liquid sensor with a deformable substrate adapted to deform in accordance with deformation of a tire. Such a sensor module may be attached to a tire (e.g., attached to an interior or exterior surface of a tire) or embedded within the tire material. In accordance with some embodiments, the sensor module is mechanical impedance matched with the tire. As used herein, mechanical impedance matching represents stiffness matching, elasticity matching, and/or coefficient of thermal expansion matching. As discussed herein, mechanical impedance mismatches between the substrate, and/or bonding agent, and the tire can limit the sensor movements and to cause energy dissipation at an interface with the tire and/or substrate, which can decrease the sensors' sensitivity and/or cause sensor failure due to fatigue.

In accordance with some embodiments, a sensor includes a flexible substrate that is mechanically impedance matched with a tire material. In accordance with some embodiments, a tire assembly includes a vehicle tire, a substrate adapted to deform in accordance with deformation of the vehicle tire, and a set of conductive liquid sensors coupled to the vehicle tire via the substrate, wherein an electrical resistance of the set of conductive liquid sensors changes in accordance with deformation of the substrate. For example, an elastomer patch with a liquid metal pattern embedded in it is attached to a tire surface.

Thus, methods, apparatuses, devices, and systems are disclosed for sensing vehicle, tire, and/or surface conditions. Such methods, apparatuses, devices, and systems may complement or replace conventional methods for sensing vehicle, tire, and/or surface conditions.

The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

FIG. 7A is a flow diagram illustrating an example method of manufacturing a tire assembly in accordance with some embodiments.

In accordance with common practice, the various features illustrated in the drawings are not necessarily drawn to scale, and like reference numerals can be used to denote like features throughout the specification and figures.

DESCRIPTION OF EMBODIMENTS

The present disclosure describes monitoring real-time tire performance using sensor(s) that are compatible with the material properties of a tire. For example, stiffness/elasticity and the thermal coefficient of expansion (CTE) of the sensor materials may match with tire material properties to provide long-term reliable operation within a pressurized tire. If the sensor has a stiffness, elasticity, and/or thermal mismatch, the sensitivity, accuracy, and/or precision of the sensor can be degraded. Furthermore, a mismatch can also limit the sensor stretchability, which can lead to fracture and/or fatigue failure when the sensor cannot stretch with the tire material. Additionally, sensors for pneumatic tires may also be subjected to high cyclic g-forces (e.g., greater than 1000 g) and long-term vibratory driving conditions due to the shape of a tire changing as it enters and exits the contact patch and in cornering and braking. Tire conditions and road conditions are also changing continuously. Many of the changes are nonlinear which makes dynamic feedback control challenging. Therefore, having sensors that are capable of providing information in real-time of road-contact information is crucial for brake and stability control and for optimizing tire design for operating in both normal and in adverse driving conditions, particularly in autonomous driving situations without human intervention to prevent catastrophic failure. The sensing devices described herein are adapted to conform to the surface profile and movements of a tire. For example, the sensing device can be attached or bonded on the interior or exterior tire surface, as well as embedded inside the composite structure of a tire. The mechanical impedance and the coefficient of thermal expansion (CTE) of the sensing device can be adapted to match with the tire.

Reference will be made to embodiments, examples of which are illustrated in the accompanying drawings. In the following description, numerous specific details are set forth in order to provide a thorough understanding of the various described embodiments. However, it will be apparent to one of ordinary skill in the art that the various described embodiments may be practiced without these particular details. In other instances, methods, procedures, components, circuits, and networks that are well-known to those of ordinary skill in the art are not described in detail so as not to unnecessarily obscure aspects of the embodiments.

Figure 1A:
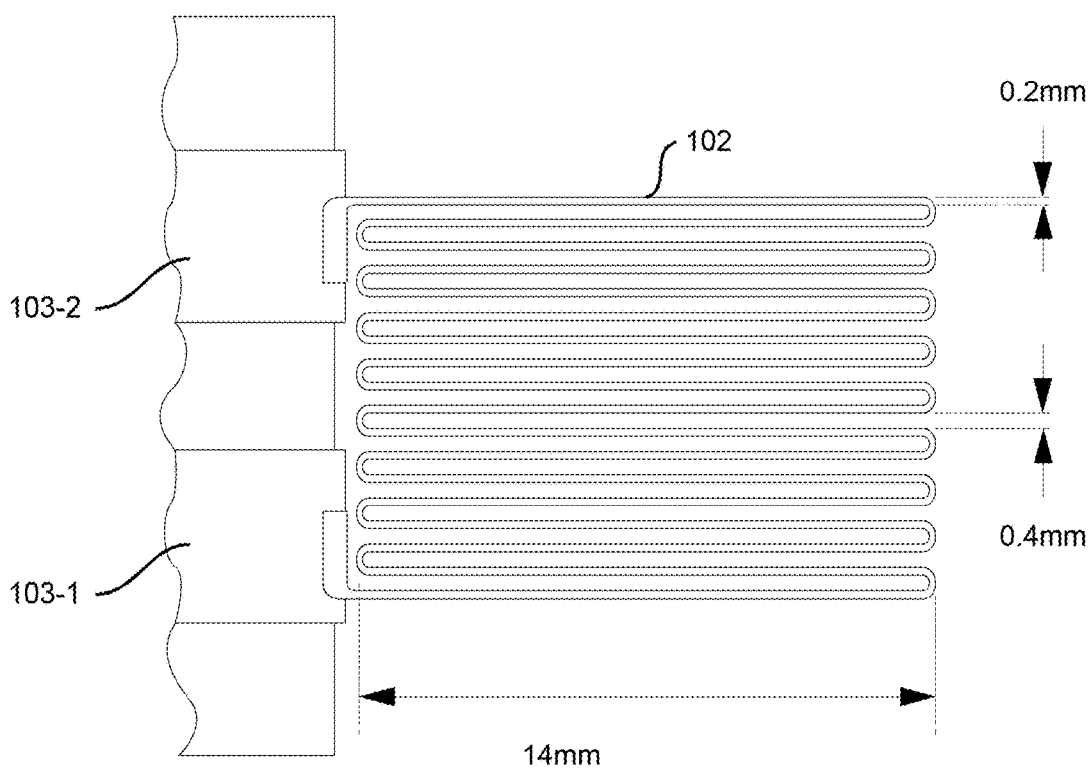
FIGS. 1A-1C illustrate example conductive liquid electrodes in accordance with some embodiments.
Figure 1B:
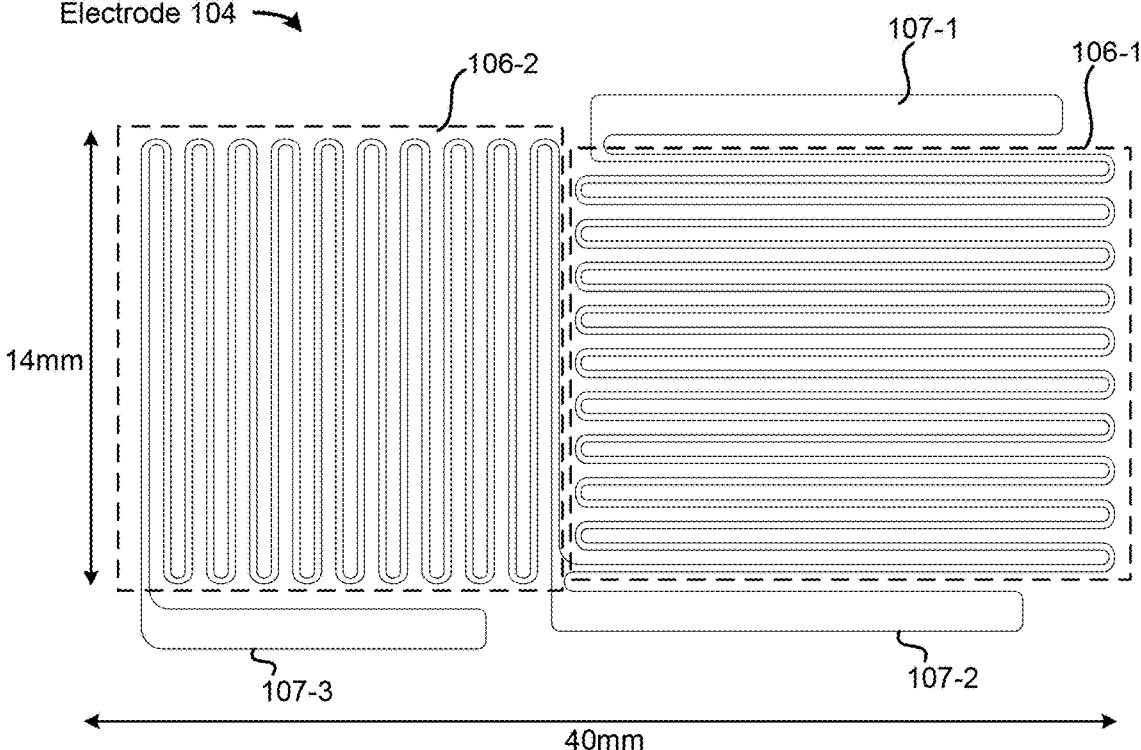

FIGS. 1A and 1B illustrate example conductive liquid electrodes in accordance with some embodiments. FIG. 1A shows a liquid electrode 102 having a serpentine shape and contacts 103-1 and 103-2. In some embodiments, the contacts 103 are composed of metal (e.g., Copper and/or Gold). In some embodiments, the contacts 103 are composed of a same material as the liquid electrode 102. In some embodiments, the liquid electrode 102 is coupled to a different number of contacts (e.g., 3 or more contacts). In some embodiments, the liquid electrode 102 has a different shape, a different number of bends, and/or a different number of lines. The liquid electrode 102 in FIG. 1A has a line width of 0.2 mm, a line length of 14 mm, and a line spacing of 0.4 mm. In some embodiments, the liquid electrode 102 has different dimensions. In some embodiments, the liquid electrode 102 has a line length in the range of 5 mm to 50 mm. In some embodiments, the liquid electrode 102 has a spacing between lines in the range of 0.05 mm to 4 mm. In some embodiments, the liquid electrode 102 has a line width in the range of 0.05 mm to 1 mm. In some embodiments, a total length of the liquid electrode 102 is in the range of 10 cm to 50 cm. In some embodiments, a total length of the liquid electrode 102 is selected such that a resistance of the liquid electrode 102 is in a desired range (e.g., 0.01 ohms to 1000 ohms). In some embodiments, the liquid electrode 102 is composed of a liquid metal (e.g., Gallium, Indium, Tin, Cadmium, and/or Bismuth). In some embodiments, the liquid metal sensor 102 has a thickness in the range of 20 pm to 300 pm. The liquid electrode 102 may be employed as a strain sensor. For example, a resistance of the liquid electrode 102 may change proportional to changes in length and/or width of the liquid electrode 102 due to stretching/ elongating. In some embodiments, the liquid electrode 102 is configured to sense strain applied in a single dimension (e.g., a uniaxial strain along a primary axis).

FIG. 1B shows a liquid electrode 104 having a first portion 106-1 and a second portion 106-2. The liquid electrode 104 is coupled to contacts 107 (e.g., contacts 107-1, 107-2, and 107-3). In some embodiments, the liquid electrode 104 is coupled to a different number of contacts (e.g., 2, 4, or more contacts). In FIG. 1B the portion 106-1 is coupled between the contacts 107-1 and 107-2, and the portion 106-2 is coupled between the contacts 107-2 and 107-3. In the example of FIG. 1B, each portion 106 has a serpentine shape. In some embodiments, one or more of the portions have a different shape, a different number of lines, and/or a different spacing between lines. The liquid electrode 104 in FIG. 1B has a line length of 14 mm and a total width of 40 mm. In some embodiments, the liquid electrode 104 has different dimensions. In some embodiments, the liquid electrode 104 is composed of a liquid metal. In some embodiments, the portion 106-1 has different dimensions than the second portion 106-2. For example, the portion 106-1 is adapted to sense transverse strain and the portion 106-2 is adapted to sense primary axial strain. In some embodiments, the portion adapted to sense transverse strain comprises an active strain gauge and/or a temperature compensation gauge. In some embodiments, the liquid electrode 102 and/or 104 is connected to (e.g., applied to) an elastomer substrate.

In some embodiments, a resistance variation of the electrode (e.g., the electrode 102 or 104) is proportional to a square of a change in length, as illustrated by Equation 1 below.

$$\frac{R}{R_0} = \frac{\frac{\rho \cdot L}{A}}{\frac{\rho_0 \cdot L_0}{A_0}} = \frac{\rho V_0}{\rho_0 V}\left(\frac{L}{L_0}\right)^2 \qquad \text{Equation 1 — Resistance Variation}$$

where R is resistance, $\rho$ is the resistivity of the material, L is the length of the electrode, A is a cross-sectional area of the electrode, and V is a volume of the electrode. The subscript 0 in Equation 1 (e.g., $R_0$, $V_0$) indicates the undeformed state for R, L, A, V, and $\rho$. In some situations, a coefficient of rolling friction increases with a second degree of speed. The coefficient of rolling friction may be defined as $$\mu_r = \mu_o + \mu_1 V_x^2.$$

In some embodiments, a liquid electrode (e.g., the liquid electrode 102 or 104) includes two or more layers (e.g., to detect strain in three dimensions). For example, the liquid electrode 104 may have a second layer (not shown in FIG. 1B) that is sensitive to strain along a z axis.

Figure 1C:
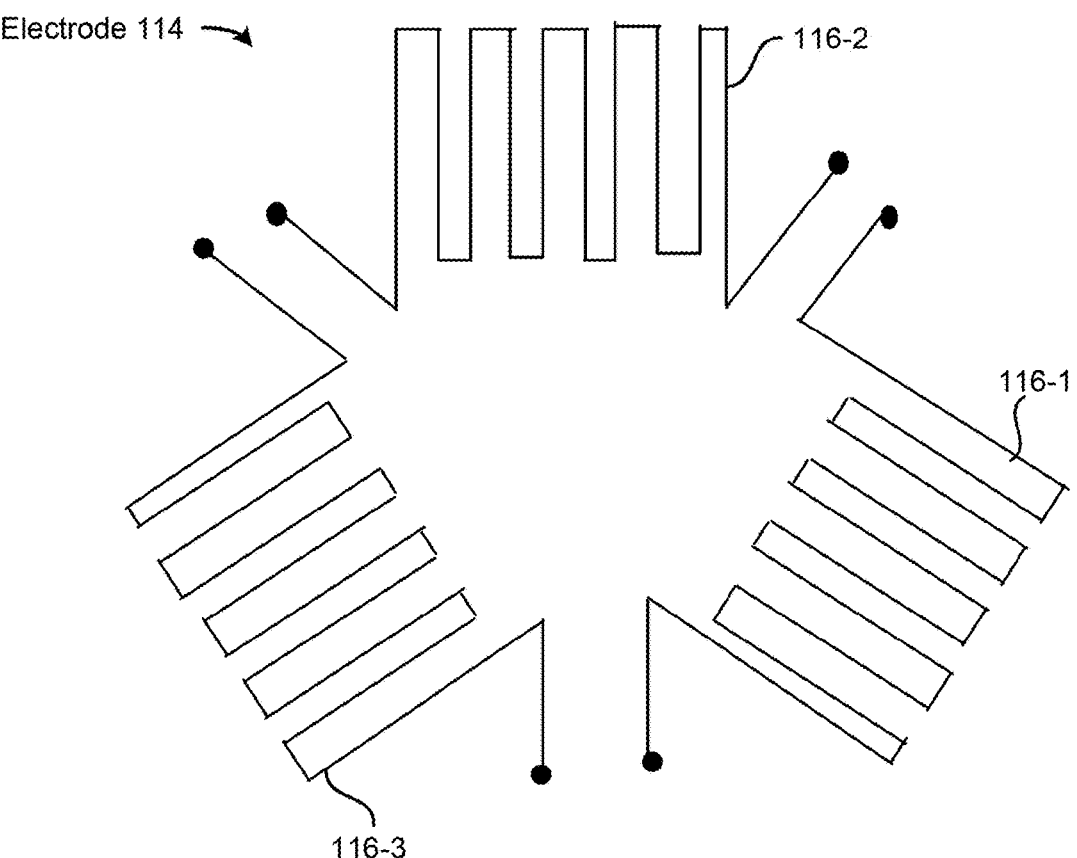

FIG. 1C illustrates an electrode 114 that includes portions 116-1, 116-2, and 116-3. As shown in FIG. 1C, each portion has a different orientation, which allows for detecting different direction components of strains and/or forces. In some embodiments, each portion 116 has a similar shape, area, and/or length. In some embodiments, one or more of the portions 116 has a different shape, area, and/or length. In some embodiments, the electrode 114 includes four or more portions. In some embodiments, the portions 116 of the electrode 114 are arranged in a different orientation and/or have a different shape (e.g., a linear, circular, or irregular shape). As shown in FIG. 1C, each portion may have distinct contacts. In some embodiments, the portions 116 share one or more contacts (e.g., share a contact for coupling to a power supply).

Figure 1D:
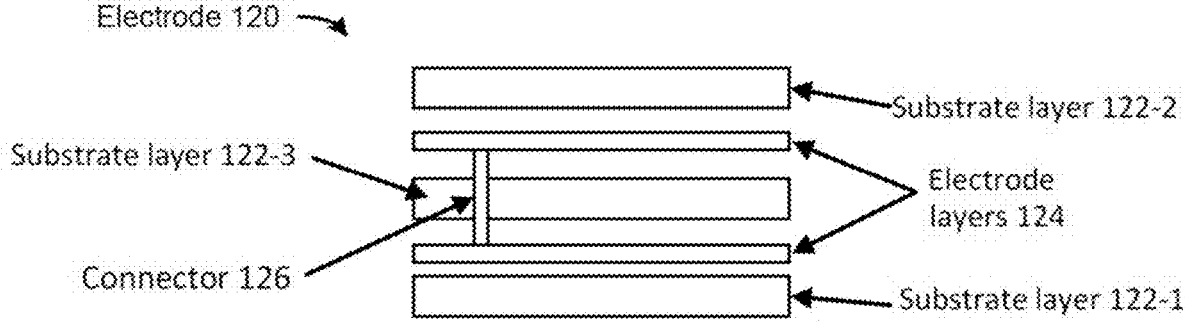
FIG. 1D illustrates an example multi-layer electrode in accordance with some embodiments.

FIG. 1D illustrates a multi-layer electrode 120 in accordance with some embodiments. The electrode 120 includes substrate layers 122 (e.g., polymer and/or elastomer layers) and electrode layers 124. In particular, FIG. 1D shows the electrode 120 in an expanded view (e.g., with the substrate layers 122 spaced apart from the electrode layers 124). In some embodiments, each substrate layer 122 is composed of a same material. In some embodiments, one or more of the substrate layers 122 is composed of a different material. In some embodiments, the substrate layers 122 are electrically insulating layers. In some embodiments, the electrode layers 124 are composed of a same material (e.g., a same liquid metal). In some embodiments, the electrode layers 124 are composed of different materials (e.g., have different dopants or additives). In some embodiments, each electrode layer 124 comprises an electrode 102, 104, or 114. In some embodiments, each electrode layer 124 comprises a different type of electrode (e.g., having a different arrangement and/or a different number of portions). The electrode 120 includes a connector 126 between the electrode layers 124. In some embodiments, the connector 126 comprises a via. In some embodiments, the connector 126 is composed of a same material as the electrodes (e.g., a liquid metal). In some embodiments, the connector 126 is composed of a nonliquid conductive material (e.g., copper). In some embodiments, each electrode layer 124 (and/or each electrode on each electrode layer) includes distinct contacts and/or connectors for coupling to a power source and/or a signal processing component (e.g., circuitry 210). In some embodiments, the electrode 120 includes a circuit board (e.g., a flexible circuit board positioned between substrate layers 122 and coupled to the electrode layers 124.

Figure 2A:
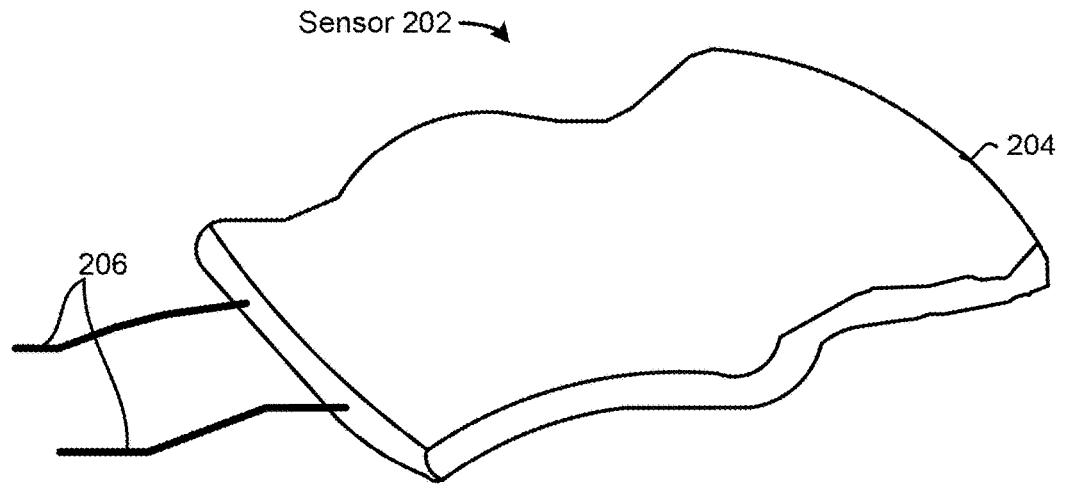
FIG. 2A illustrates an example sensor in accordance with some embodiments.

FIG. 2A illustrates a sensor 202 in accordance with some embodiments. The sensor 202 includes a substrate 204 and electrical connectors 206. In some embodiments, the substrate 204 is an elastomeric substrate. In some embodiments, a liquid electrode (e.g., the liquid electrode 102 or 104) is attached to (and/or embedded in) the substrate 204. For example, one or more liquid metal conductive traces are embedded in the substrate 204. In some embodiments, the sensor 202 has a width in the range of 10 mm to 100 mm. In some embodiments, the sensor 202 has a length in the range of 10 mm to 100 mm. In some embodiments, the substrate 204 is composed of a tire material (e.g., a same material as tire 208 in FIG. 2B). In some embodiments, the tire material comprises rubber. In some embodiments, the electrical connectors 206 comprise flexible connectors partially embedded in the substrate 204. In some embodiments, the electrical connectors 206 are connected to respective contacts of a liquid electrode (e.g., contacts 103 of liquid electrode 102). In some embodiments, the electrical connectors 206 are mesh connectors.

In some embodiments, the sensor 202 includes one or more other components embedded in the substrate 204 and/or attached to the substrate 204. For example, one or more of the components of system 500 may be embedded in and/or attached to the substrate 204. In some embodiments, the sensor 202 includes one or more liquid electrodes and one or more electronics embedded in and/or attached to the substrate 204. In some embodiments, the sensor 202 includes multiple layers of liquid electrodes and/or electronics embedded in the substrate 204. In some embodiments, one or more liquid electrodes are embedded in the substrate 204 in multi-layer polymer structure (e.g., a multi-layer stack). In some embodiments, one or more parameters of the substrate 204 are adjusted to match a mechanical impedance of the multi-layer stack and/or a tire wall (e.g., of the tire 208).

In some embodiments, the sensor 202 is embedded in a tire material. In some embodiments, the sensor 202 is embedded in a tire (e.g., during a vulcanization process). In some embodiments, the sensor 202 is embedded in a tread area, a side-wall area, or different tire region during manufacture of the tire. In some embodiments, the sensor 202 is attached to a region of the tire (e.g., during/after a vulcanization process). In some embodiments, a stiffness of the substrate 204 (e.g., a polymer substrate material) is modified to match tire thermal and mechanical characteristics (e.g., such that the sensor substrate material does not induce strain onto the tire surface).

In some embodiments, one or more protective layers (e.g., an elastomer layer such as polydimethylsiloxane (PDMS)) are applied to the substrate 204. In some configurations, the sensor 202 includes an environmental barrier. The environmental barrier may be a sealing material (e.g., rubber or polymers) so that when the sensor 202 is mounted on a tire, the environmental barrier prevents or reduces contaminants (e.g., water, dirt, and/or other contaminants) from entering the sensor 202. This feature reduces or eliminates damages to electronics and/or electrodes embedded in, or attached to, the substrate 204.

Figure 2B:
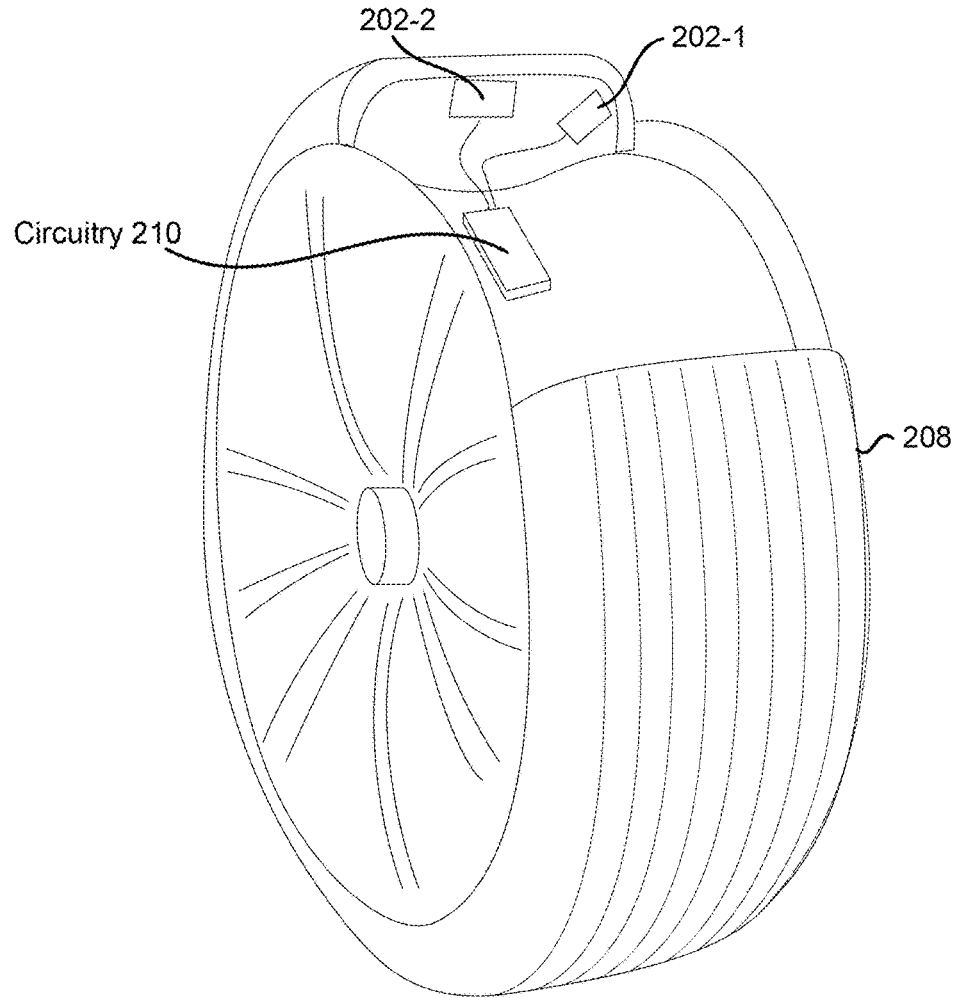
FIG. 2B illustrates a tire with example sensors mounted thereon in accordance with some embodiments.

FIG. 2B illustrates a tire with example sensors mounted thereon in accordance with some embodiments. In FIG. 2B, a tire 208 includes sensors 202-1 and 202-2 and circuitry 210. The tire 208 has the tread region extending between two curved regions. The curved regions extend from the tread region to side wall and bead regions (one of which may be called an outer side wall and the other may be called an inner side wall, or vice versa, depending on an orientation of how the tire is mounted on a wheel). The tire 208 also has bead regions that contact a rim of a wheel when the tire 208 is mounted on the wheel. In some embodiments, the bead regions include bead wires and/or one or more belts in the tread region. When the tire 208 is mounted on a wheel, the rim of the wheel seals the opening so that the air in the tire is maintained within the tire space. In some embodiments, the tire 208 includes a first sensor arranged in a tread area and a second sensor arranged in a side-wall area. In some embodiments, a controller (e.g., the controller 550 in FIG. 5C) aggregates data from the first and second sensors.

In some configurations, one or more electrical components are located within the tire space of the tire 208 (e.g., one or more sensors to measure rotation, acceleration, deceleration, vibration, temperature, and/or pressure) while one or more energy-harvesting devices are located outside the tire space. In some embodiments, an electrical connector relays power and/or electrical signals from the one or more energy-harvesting devices to the one or more electrical components located within the tire space. In some embodiments, the vehicle includes one or more processors that are communicatively coupled to respective electrical components at each wheel of the vehicle. For example, each set of electrical components are configured to process/analyze sensor and/or energy harvester signals for a particular wheel and the processor(s) are configured to process/analyze (e.g., compare) signals between wheels.

In some embodiments, the sensors 202 are attached to an inside of the tire 208 (e.g., on a tread region, a side-wall region, and/or the curved transition area between the tread region and the side-wall region). In some embodiments, the sensors 202 are collocated with an energy harvesting module (e.g., a piezoelectric polymer device). In some embodiments, the sensor 202 includes one or more collocated components (e.g., an analog-to-digital converter and/or a communication module). In some embodiments, the communication module includes a radio frequency (RF) tag. For example, an RFID tag may be encapsulated within the liquid metal sensor. A polymer piezoelectric material may be used for powering the RFID tag.

In some embodiments, the circuitry 210 includes an amplifier component, a data conversion component (e.g., an analog-to-digital converter), a data acquisition component, and/or a communications component. In some embodiments, the circuitry 210 includes a power source (e.g., a current source coupled to a sensor 202 via the electrical connectors 206). In some embodiments, the communications component is configured for wireless communication (e.g., includes a transmitter, a receiver, and/or a transceiver). In some embodiments, the communications component is configured to communicate using WiFi and/or Bluetooth protocols. In some embodiments, the circuitry 210 is communicatively coupled to one or more other sensors (e.g., pressure sensors, temperature sensors, and/or other types of sensors). In some embodiments, the circuitry 210 is communicatively coupled to a controller (e.g., a controller mounted to a wheel, frame, or other portion of a vehicle). In some embodiments, a sensor 202 includes some, or all, of the circuitry 210 (e.g., the circuitry 210 is a component of the sensor 202). In some embodiments, the circuitry 210 is co-located with a sensor 202. In some embodiments, the circuitry 210 is attached to a wheel or rim of a vehicle. In some situations, attaching the circuitry 210 to the rim (as opposed to attaching it to the tread region of the tire) reduces vibration and deformation forces on the circuitry (e.g., reducing wear and tear on the circuitry 210 during vehicle use). In some embodiments, the circuitry 210 is attached to a side wall or bead portion of the tire 208 (e.g., allowing the circuitry 210 to be easily transported with the tire but still being subjected to less vibration and deformation forces than if it were attached to the tread region). In some embodiments, the circuitry 210 is coupled to a tire valve stem (e.g., as a component of a TPMS).

Figure 2C:
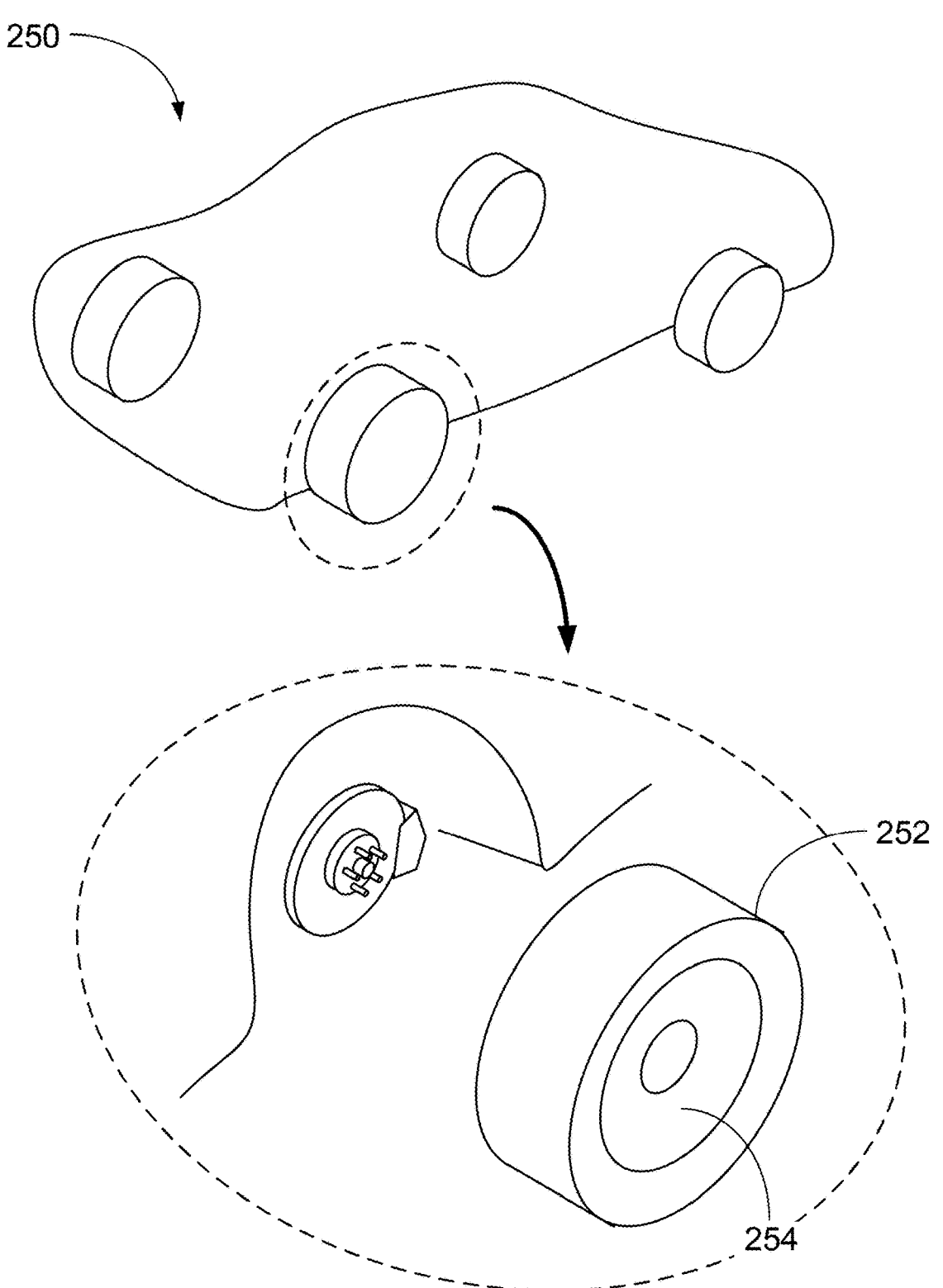
FIG. 2C is a schematic diagram illustrating parts of an automobile in accordance with some embodiments.

FIG. 2C is a schematic diagram illustrating parts of a vehicle 250 (e.g., an automobile) in accordance with some embodiments. In some embodiments, the vehicle 250 includes a wheel 254 and a tire 252 (e.g., the tire 208) mounted on the wheel 254. In some embodiments, an energy-harvesting device is mounted adjacent to a wheel 254 (e.g., mounted on the wheel 254). In some embodiments, the energy-harvesting device is positioned adjacent to a rim of the wheel 254. Positioning of the energy-harvesting device adjacent to the rim of the wheel 254 can be advantageous for energy-harvesting devices that utilize the centrifugal force, its variation, and/or associated vibration for energy harvesting (e.g., converting kinetic, mechanical energy into electrical energy). In some embodiments, the energy-harvesting device is positioned in a tread region of a tire. In some embodiments, two or more energy-harvesting devices are mounted on the wheel 254. In some embodiments, the energy-harvesting device is positioned adjacent to the rim on a side of the wheel facing away from the automobile. In some embodiments, the energy-harvesting device is positioned adjacent to the rim on a side of the wheel facing toward the automobile. In some embodiments, each wheel of the vehicle 250 includes one or more energy-harvesting devices. In some embodiments, the vehicle 250 includes an electrical component (e.g., a controller) in communication (e.g., wireless communication) with the energy-harvesting devices and one or more sensors (e.g., the sensor 202). In some embodiments, the electrical component, the energy-harvesting devices, and/or the one or more sensors are attached to, or embedded in, one or more wheels of the vehicle. In some embodiments, the electrical component is configured to aggregate the data from the energy-harvesting devices and/or the sensors. In some embodiments, the electrical component is configured to determine a driving condition, braking condition, and/or load distribution based on the aggregated data. Although the vehicle 250 is shown in FIG. 2C as an automobile, in some embodiments, the vehicle is a farming vehicle, a bicycle, an aircraft, or other type of vehicle.

Figure 2D:
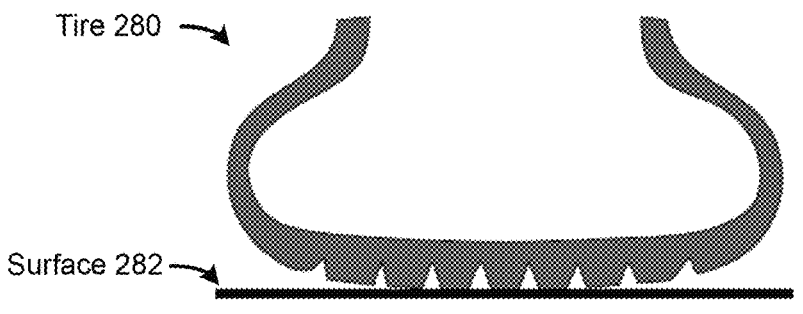
FIGS. 2D-2G illustrate a tire bending under different circumstances in accordance with some embodiments.
Figure 2E:
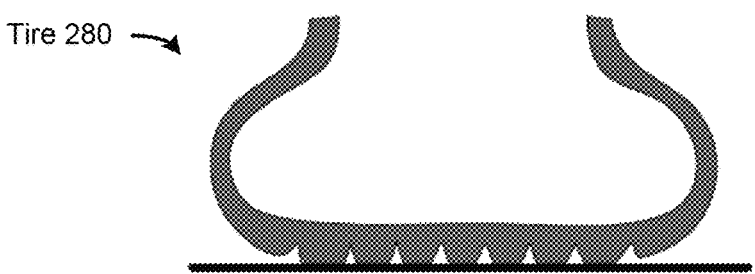
Figure 2F:
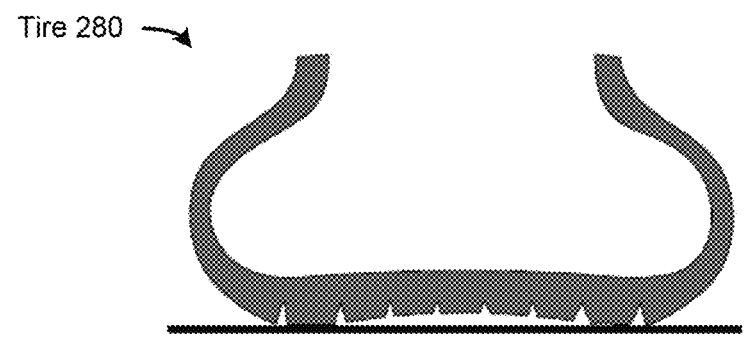
Figure 2G:
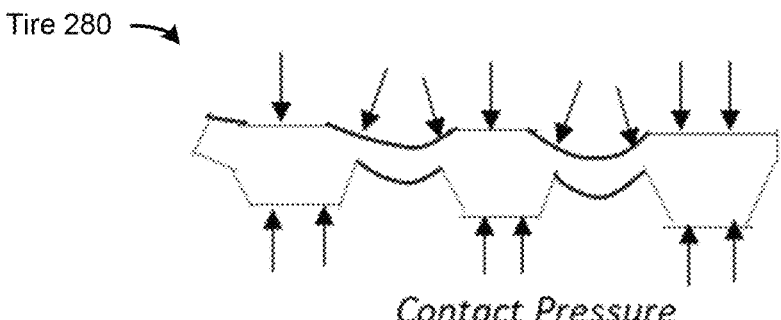

FIGS. 2D-2G illustrate a tire (e.g., the tire 208) bending under different circumstances in accordance with some embodiments. FIG. 2D shows the tire 280 in an over-inflated condition as indicated by the outer portions of the tread region not contacting the surface 282. FIG. 2E shows the tire 280 in a proper inflation condition in which a middle portion and edge portions of the tread region are in contact with the surface. FIG. 2F shows the tire 280 in an under-inflated condition as indicated by the middle portion of the tread region not contacting the surface. In some embodiments, a sensor (e.g., the sensor 202) arranged in the tread region is configured to detect differences in contact pressure, inflation pressure, velocity, and/or load based on changes to strain in the tread region. FIG. 2G shows an enlarged view of the tread region of tire 280. The tire 280 in FIG. 2G shows local bending in the tread region and the arrows in FIG. 2G indicate contact pressure on the treads. Thus, FIGS. 2D-2G illustrate the profile of the tire 280 changing depending on the inflation pressure and the strain shifting from the tread area in the over-inflated condition to the corner/sidewall in the under-inflated condition. Additionally, the viscoelastic effect changes the tire stiffness characteristics due to different driving speed and tire wall surface temperatures.

Figure 2H:
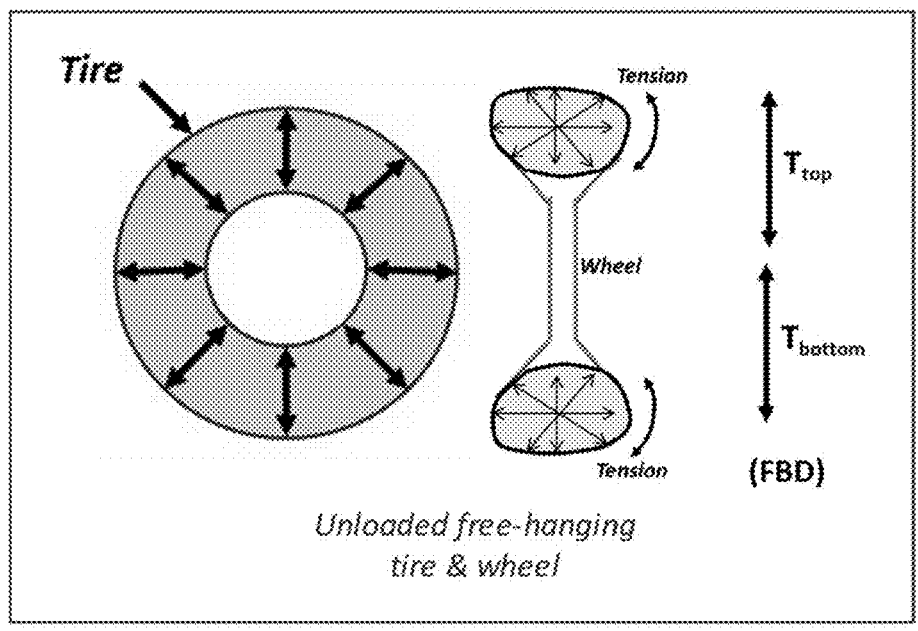
FIGS. 2H and 2I illustrate tension on a tire under difference circumstances in accordance with some embodiments.
Figure 2I:
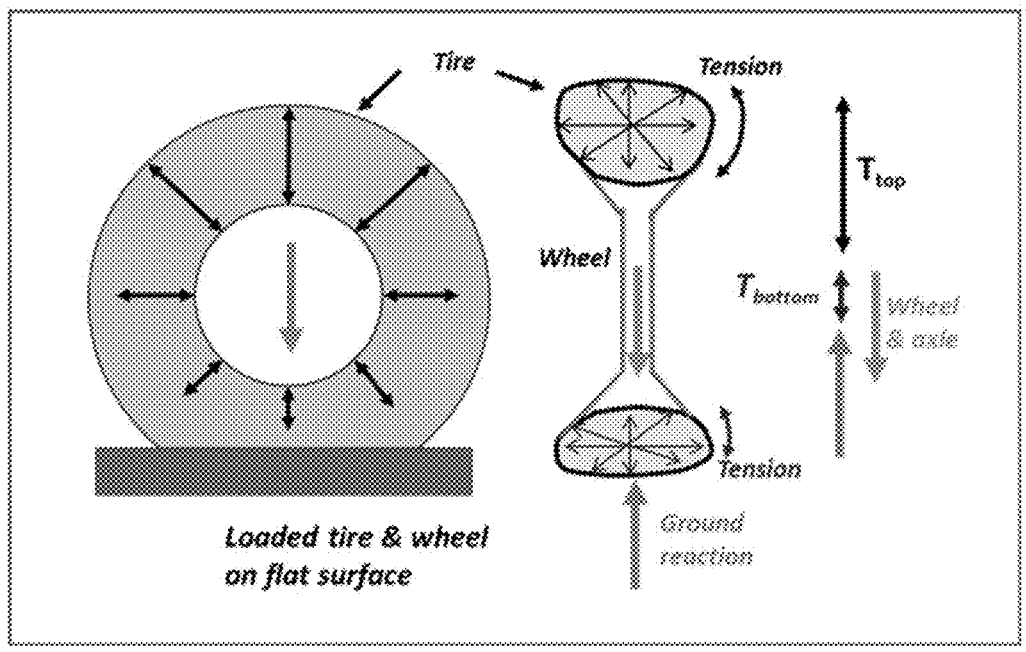

FIGS. 2H and 2I illustrate tension on a tire under difference circumstances in accordance with some embodiments. FIG. 2H illustrates tension on a tire (e.g., the tire 208) in a free-hanging state (e.g., not in contact with a surface). In particular, FIG. 2H shows a free body diagram in which side wall tension is distributed evenly from top to bottom (e.g., $T_{Top}=T_{Bottom}$). FIG. 2I illustrates tension on the tire in a loaded state (e.g., with a load applied while on a flat surface). In particular, FIG. 2I shows a greater tension on a top side wall of the tire as compared to a bottom (or lower) side wall. For example, the tension in the cords between the rim and the ground is relived while the tension on the rim top remains unchanged. In this way, the vehicle can be considered to hang from the top of the tire as the axle load passes through the side wall. For example, the axle load is supported by the tire side wall tension (e.g., using the compressed air inflating the tire). As illustrated by FIGS. 2H and 2I, a sensor (e.g., the sensor 202) arranged at different positions along the tire (e.g., top side wall or bottom side wall) is able to detect tire and/or surface conditions based on changes to strain at the sensor position.

Figure 2J:
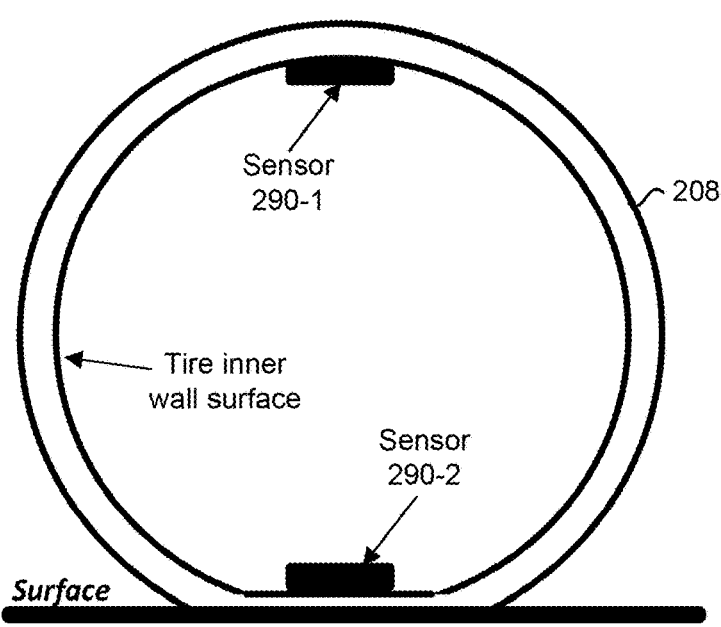
FIGS. 2J and 2K illustrate example sensor arrangements within a tire in accordance with some embodiments.
Figure 2K:
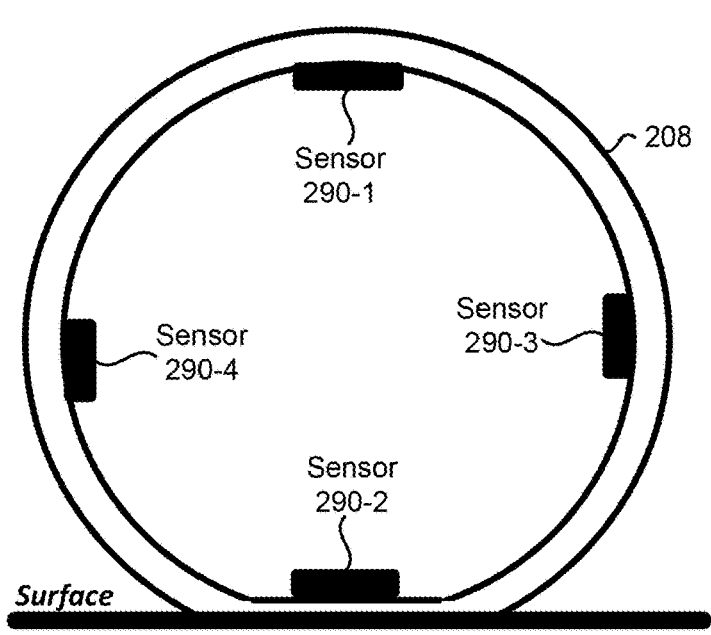

FIGS. 2J and 2K illustrate example sensor arrangements within a tire in accordance with some embodiments. FIG. 2J illustrates an arrangement with two sensors 290. In some embodiments, each of the sensors 290 is an instance of the sensor 202. In the example of FIG. 2J the sensors 290 are arranged to be substantially opposite one another. As shown in FIG. 2J, sensor 290-2 is in a contact patch of the tire 208 and the sensor 290-1 is outside the contact patch (e.g., on a top portion of the tire). The sensor 290-2 detects strain associated with the contact patch (e.g., used to determine patch length, traction forces, and/or breaking forces). In some embodiments, each tire of the vehicle includes at least one sensor 290 coupled to a controller (e.g., configured to determine load distribution based on the sensor signals).

Having two sensors 290 as illustrated in FIG. 2J allows for twice as much sensing per revolution (e.g., as each sensor moves through the contact patch). Additionally, the two sensors 290 may be configured to concurrently detect maximum and minimum axial strain. The data from the sensor 290-1 (e.g., in combination with the data from sensor 290-2 and/or a dummy sensor) may be used (e.g., by the circuitry 210) to determine temperature compensation for the tire 208. FIG. 2K illustrates an arrangement with four sensors 290. In some embodiments, other sensor arrangements may be used (e.g., 3, 5, or 6 sensors per tire). Increasing the number of sensors in the tire provides additional data per tire revolution, which may improve overall system performance (e.g., able to more quickly detect changes in tire and/or surface conditions). In some embodiments, a power and/or communication module (e.g., the circuitry 210) is coupled to the tire 208 (e.g., bonded to a portion of the tire surface with reduced vibration and/or surface deformation as compared to portions in which sensors 290 are positioned). In some embodiments, the power and/or communication module comprises a multiplexing circuit (e.g., multiplexing signals from multiple sensors to reduce the number of analog-to-digital converters needed in the system). In some embodiments, at least a subset of the sensors 290 are mounted to a tread region or a side wall region of the tire 208. In some embodiments, a bus connector (e.g., a bus cable) communicatively couples one or more of the sensors 290 and the power and/or communication module. In some embodiments, the bus connector provides power (and/or control signals) to the sensors 290 and receives sensing information from the sensors 290. In some embodiments, the power and/or communication module is bonded to an inner surface of the tire. In some embodiments, one or more additional sensors are mounted to an inner surface of the tire. For example, the additional sensors may include a pressure sensor, a temperature sensor, a moisture sensor, an accelerometer, and/or a gyro (angular velocity) sensor. In some embodiments, one or more additional sensors are integrated with the power and/or communication module.

Figure 3A:
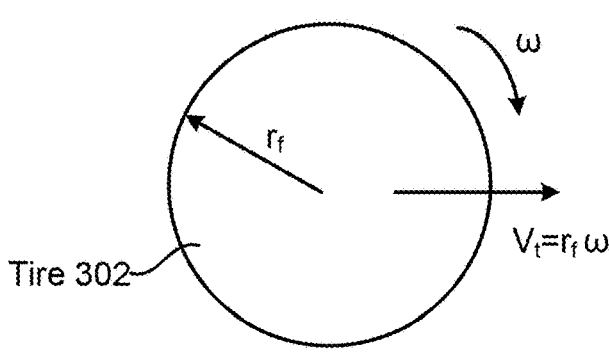
FIGS. 3A-3C illustrate example tire states in accordance with some embodiments.
Figure 3B:
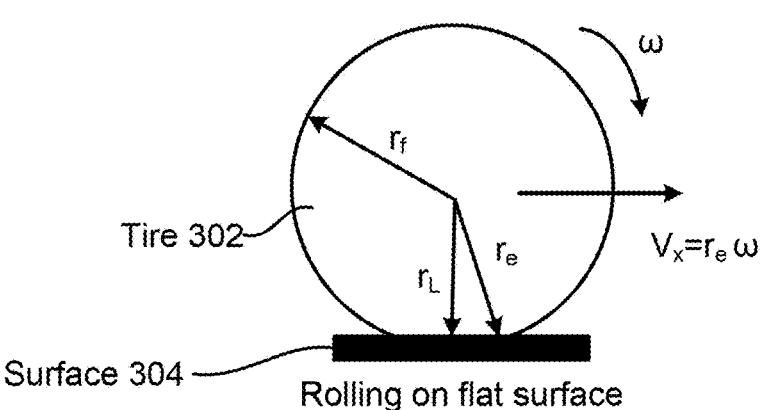
Figure 3C:
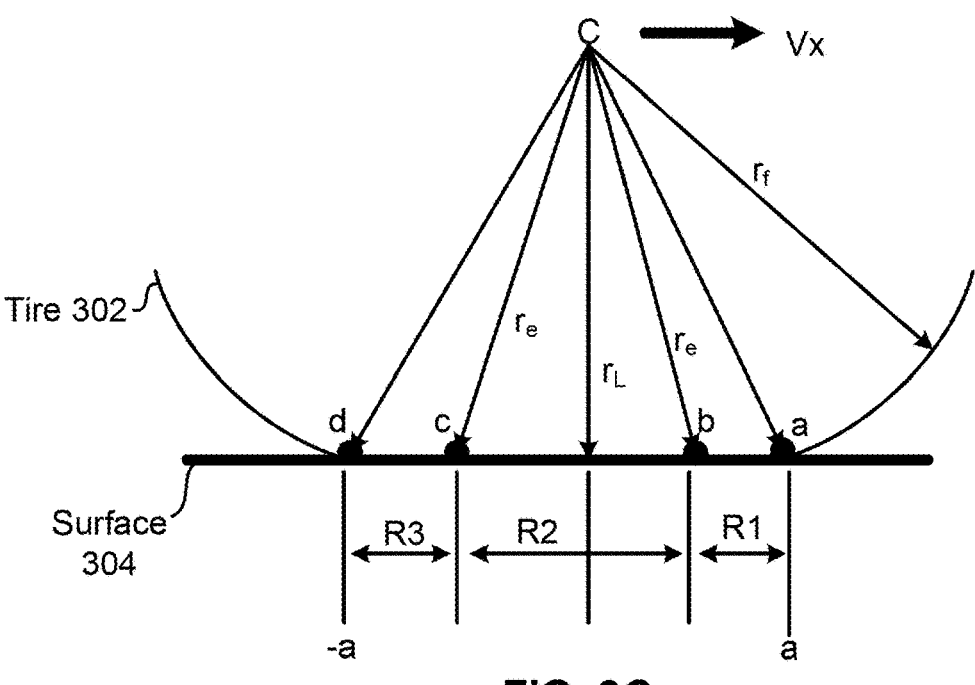

FIGS. 3A-3C illustrate example tire states in accordance with some embodiments. FIG. 3A shows a tire 302 in a free spinning state (e.g., with no deformation). The tire 302 has a radius denoted as $r_f$ (e.g., referred to as a free radius), an angular velocity denoted as ω, and a velocity, $V_f$, equal to the free radius multiplied by the angular velocity. FIG. 3B shows the tire 302 rolling on a flat surface 304. The tire 302 in FIG. 3B has a free radius, $r_f$, an effective radius, $r_e$, and a load radius $r_L$. The tire 302 in FIG. 3B has the angular velocity, ω, and a velocity $V_x$ equal to the effective radius multiplied by the angular velocity. FIG. 3C shows an enlarged view of the contact patch (from point 'd' to point 'a') between the tire 302 and the surface 304. FIG. 3C shows that the tire 302 has a radius of $r_e$ at points 'b' and 'c' between the tire 302 and the surface 304. At points outside of the contact patch the tire 302 has a radius of $r_f$ and in a center of the contact patch the tire 302 has a radius of $r_L$. In the regions of the contact patch denoted as R1 and R3, the tire 302 has a radius between $r_e$ and $r_f$. In the region of the contact patch denoted as R2, the tire 302 has a radius between $r_L$ and $r_e$.

As illustrated by FIGS. 3A-3C, the tire 302 deforms as it contacts the surface 304. For example, the amount of deformation may depend on the tire pressure, the elasticity/stiffness of the tire (e.g., tire conditions), a load applied to the tire, and/or a stiffness of the surface. In some embodiments, a sensor 202 is positioned on a portion of the tire 302 in the contact patch (e.g., between points 'd' and 'a' in FIG.

3C). In some embodiments, the sensor 202 is adapted to deform with the tire 302. In some embodiments, one or more properties of the sensor 202 change in accordance with deformation of the sensor 202 (e.g., a resistivity, a capacitance, and/or an inductance). In some embodiments, based on the changes in the one or more properties of the sensor 202, the sensor 202 and/or a controller in communication with the sensor 202 is configured to determine a traction force on the tire, a lateral force on the tire, a vertical force on the tire, a load on the tire, a vehicle speed, a turning angle of the vehicle, tire grip/slip, one or more surface conditions, and/or one or more braking conditions. For example, tire deformation in the road-contact region is due to an external tensile force and/or compressive force applied to the tire. As an example, the electrical resistance of the liquid electrode may proportionally increase or decrease according to the deformation of the sensor substrate with the tire material. A tire material stiffness may be denoted as $C_{px}$, $C_{py}$, $C_{pz}$. In this way, a longitudinal force on the tire may be defined as $F_x=C_{px}\cdot\Delta x$, the lateral force may be defined as $F_y=C_{py}\cdot\Delta y$, and the vertical force may be defined as $F_z=C_{pz}\cdot\Delta z$. Notably, the stiffness of a tire can change due to temperature (e.g., stiffness increases as temperature decreases) and frequency (e.g., stiffness increases as frequency increases). Therefore, a sensor (e.g., the sensor 202) may be adapted such that its stiffness changes at a same rate as the tire material due to temperature and/or frequency.

Figure 3D:
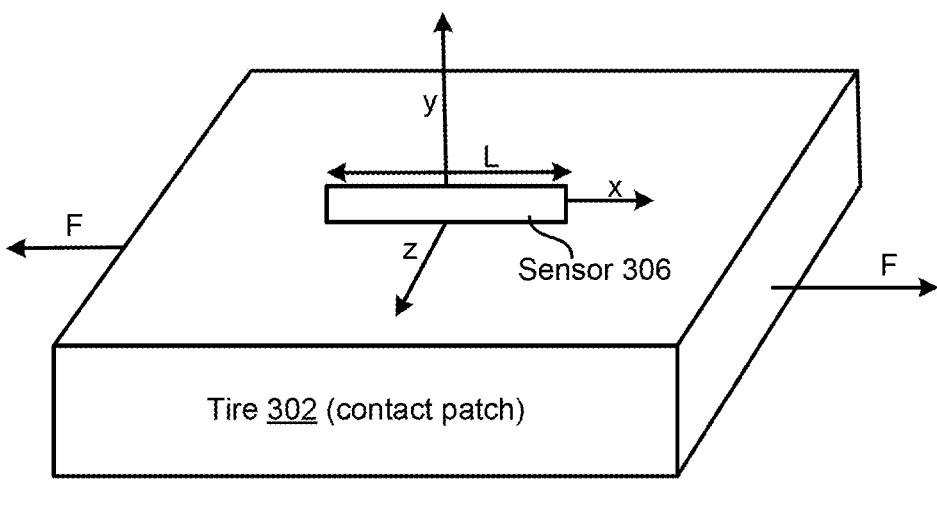
FIGS. 3D-3H illustrate example sensors mounted on tires in accordance with some embodiments.

FIGS. 3D-3H illustrate example sensors mounted on tires in accordance with some embodiments. FIG. 3D shows a sensor 306 attached to a contact patch of tire 302. In some embodiments, the sensor 306 is an instance of the sensor 202. In some embodiments, the sensor 306 is composed of a substrate with an embedded liquid metal electrode. In some embodiments, the sensor 306 is attached to a surface of the tire 302 via an adhesive or bonding agent. FIG. 3D shows forces, F, applied to the sensor 306 from the tire 302 (e.g., due to contact with a surface). FIG. 3D also shows a length, L, of the sensor 306 (e.g., corresponding to a length of an electrode of the sensor 306 along an x axis (e.g., a direction of travel).

In some embodiments, the sensor 306 comprises an elastomer substrate with a conductive liquid electrode embedded within it. In some embodiments, a stiffness, elasticity, and/or coefficient of thermal expansion (CTE) of the elastomer substrate is substantially matched (e.g., within 10%, 5%, 1%, or 0.1%) with a stiffness, elasticity, and/or CTE of the tire material.

As illustrated in FIG. 3C, the shape of tire 302 deforms as it enters and exits the surface-contact patch. For example, the tire deformation in the surface-contact patch can be due to an external tensile force or compressive force applied to the tire. In this example, the elastomer substrate of the sensor 306 stretches or contracts with the tire material. The change in shape of the elastomer substrate causes a change in shape of the conductive liquid electrode. The electrical resistance of the conductive liquid electrode may proportionally increase or decrease according to the deformation of the elastomer substrate. The resistance, R, of the conductive liquid electrode may change as shown in Equation 2 below.

$$\frac{\Delta R}{R} = K_S\cdot\varepsilon \qquad \text{Equation 2—Resistance change due to strain}$$

where $K_S$ is a gauge sensitivity factor of the conductive liquid electrode and $\varepsilon$ is a strain on the conductive liquid electrode.

Figure 3E:
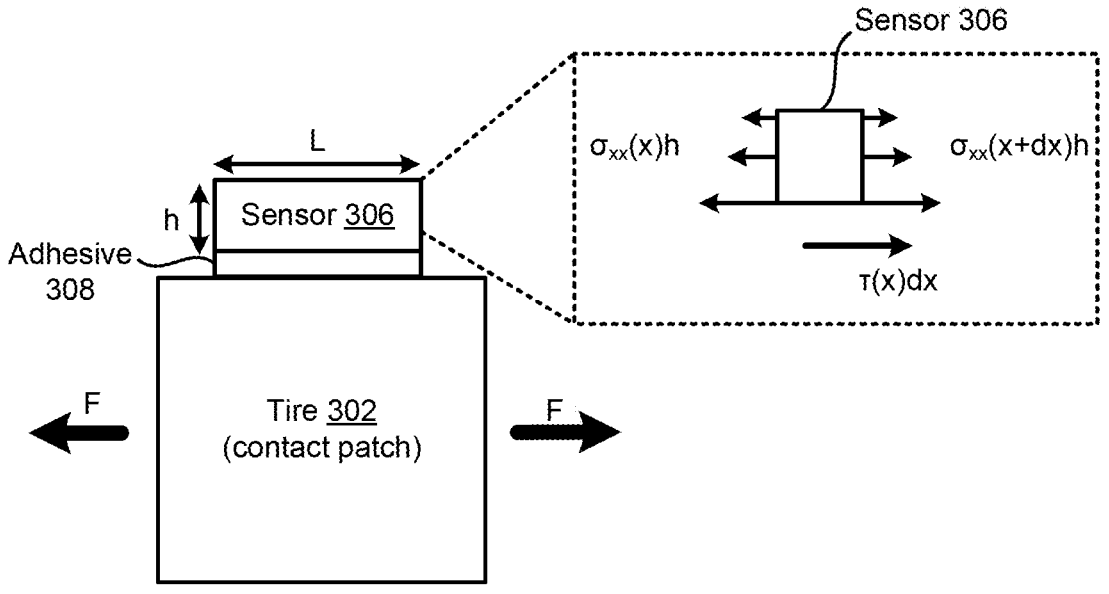

FIG. 3E shows the sensor 306 attached to the tire 302 via an adhesive 308. In some embodiments, a stiffness, elasticity, and/or CTE of the adhesive 308 is substantially matched (e.g., within 10%, 5%, 1%, or 0.1%) with a stiffness, elasticity, and/or CTE of the tire material. Matching the stiffness, elasticity, and CTE of the tire material can improve the sensitivity of the sensor 306 and/or allow the sensor 306 to more accurately detect deformation of the tire 302. The sensor 306 in FIG. 3E has a length, L, along the x axis (e.g., the direction of travel) and a height, h. FIG. 3E further shows the force balance equation for sensor 306, where $\sigma_{xx}(x)$ is an axial stress and $\tau(x)$ is the shear stress at the surface.

The applied force can be determined based on the measured resistance change, $\Delta R$, which corresponds to strain due to an applied force, as shown in Equation 3 below.

$$\varepsilon_{avg} = \frac{\int_{-L/2}^{L/2}\varepsilon_x\cdot dx}{L} \qquad \text{Equation 3—Average strain}$$

In accordance with Hook's law for elastic materials, a stress, $\sigma$, divided by the strain, $\varepsilon$, is equal to the modulus of the material, E. The force component corresponds to the stress, $\sigma$. In this way, a surface-contact force can be determined from the measurement of $\Delta R$. However, a stiffness/elasticity mismatch between the sensor materials and/or the bonding agent and the tire materials can limit the sensor's movements and to cause energy dissipation at the interface. As a result, the sensor's sensitivity and/or accuracy can be affected, and/or sensor failure can occur due to fatigue.

Figure 3F:
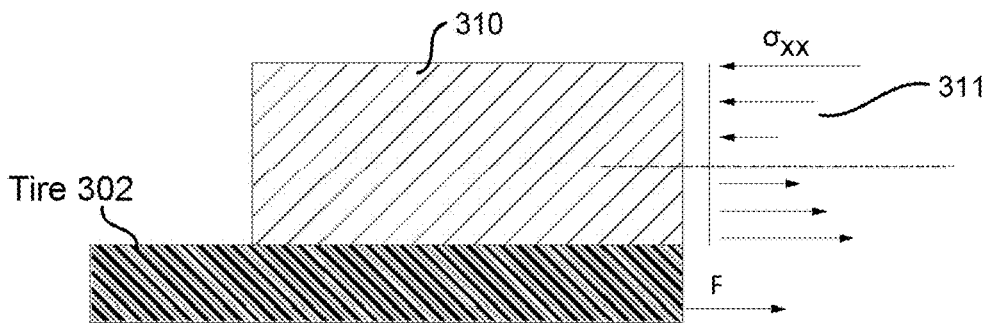

FIG. 3F shows an example of a sensor 310 attached to the tire 302. The sensor 310 in FIG. 3F has a mechanical impedance mismatch with the material of the tire 302 as illustrated by the axial stress lines 311. The sensor 310 develops bending along its length having tensile stress at the tire-sensor interface and compressive stress at the top surface. If the sensing electrode is placed on the top surface of the sensor 310 then the strain data will be inaccurate.

Figure 3G:
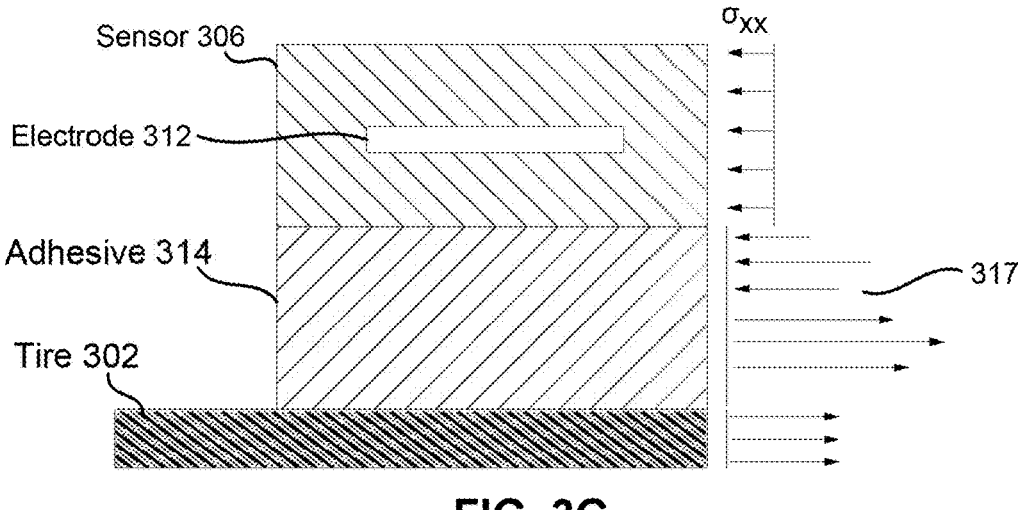

FIG. 3G shows the sensor 306 with an embedded electrode 312. The sensor 306 in FIG. 3G is attached to the tire 302 via an adhesive 314 (e.g., an epoxy). The adhesive 314 in FIG. 3G has a mechanical impedance mismatch with the material of the tire 302 as illustrated by the axial stress lines 317. For example, the adhesive 314 may have a mechanical impedance match with the sensor 306, but not with the tire material. The mechanical impedance mismatch can cause the sensor 306 to fail to accurately measure the strain from the tire 302.

Figure 3H:
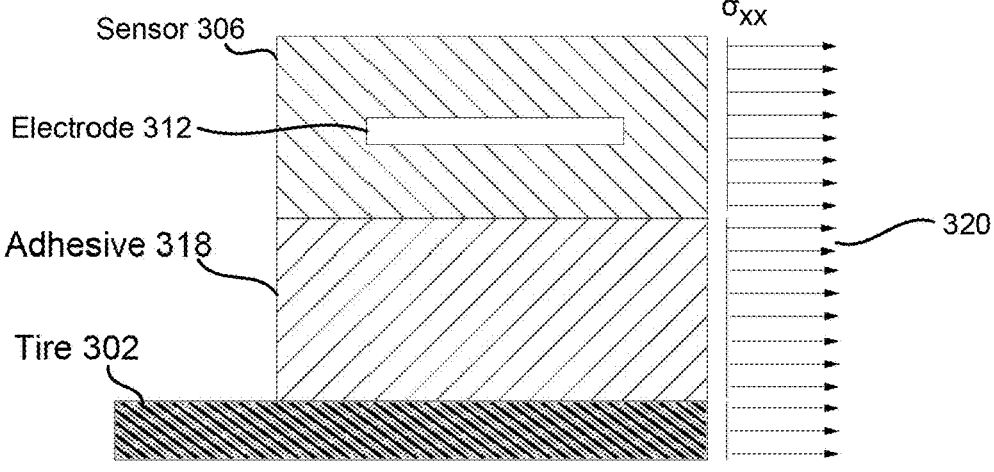

FIG. 3H shows the sensor 306 with the embedded electrode 312. The sensor 306 in FIG. 3H is attached to the tire 302 via an adhesive 318 (e.g., an epoxy or glue). The adhesive 318 in FIG. 3H has a mechanical impedance match (and a CTE match) with the material of the tire 302 and the sensor 306 as illustrated by the axial stress lines 320.

Figure 4A:
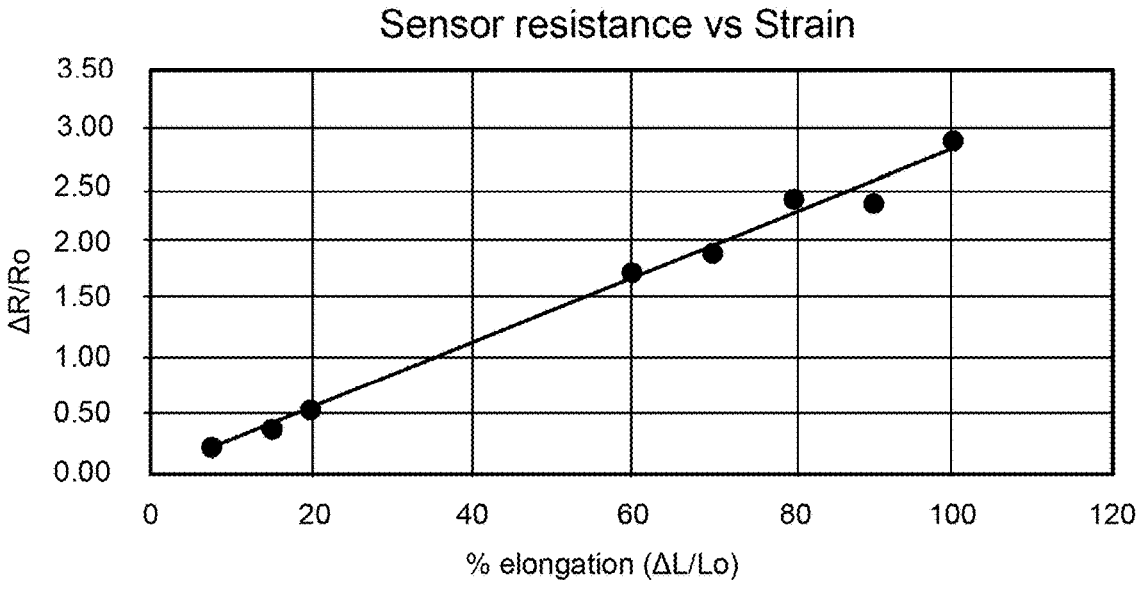
FIGS. 4A-4D illustrate example sensor data from tire-mounted sensors in accordance with some embodiments.
Figure 4B:
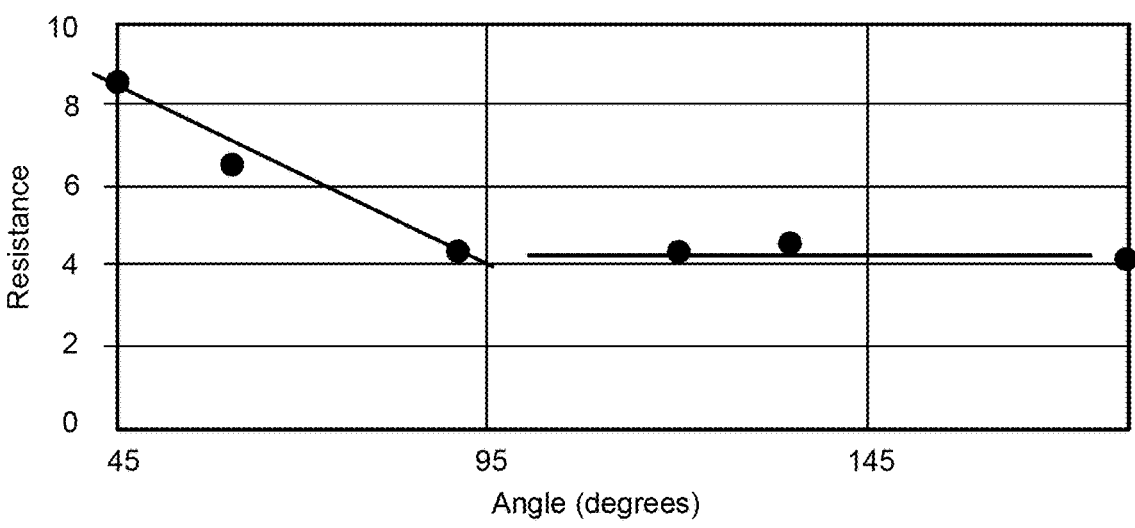
Figure 4C:
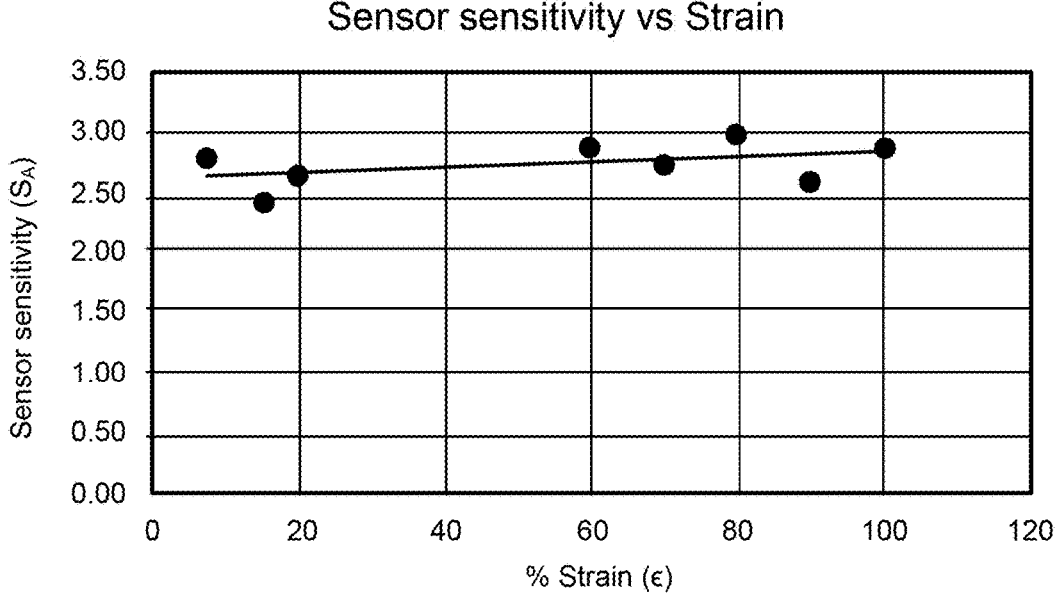

FIGS. 4A-4D illustrate example sensor data from tire-mounted sensors in accordance with some embodiments. FIG. 4A shows graph 400 illustrating a linear relationship between changes in length (e.g., due to elongation or contraction) and changes in resistance of a sensor (e.g., the sensor 202 or the sensor 306). As illustrated by graph 400, the linear relationship between the change in length and change in resistance is maintained up through 100% elongation. FIG. 4B shows graph 402 illustrating the relationship between a bending angle and resistance of a sensor (e.g., the sensor 202 or the sensor 306). As illustrated by graph 402, the sensor can be used to detect angular position changes. FIG. 4C shows graph 404 illustrating the relationship between a percent strain and a sensitivity of a sensor (e.g., the sensor 202 or the sensor 306). As illustrated by graph 404, the sensitivity of the sensor is maintained between 0 percent and 100 percent strain.

Figure 4D:
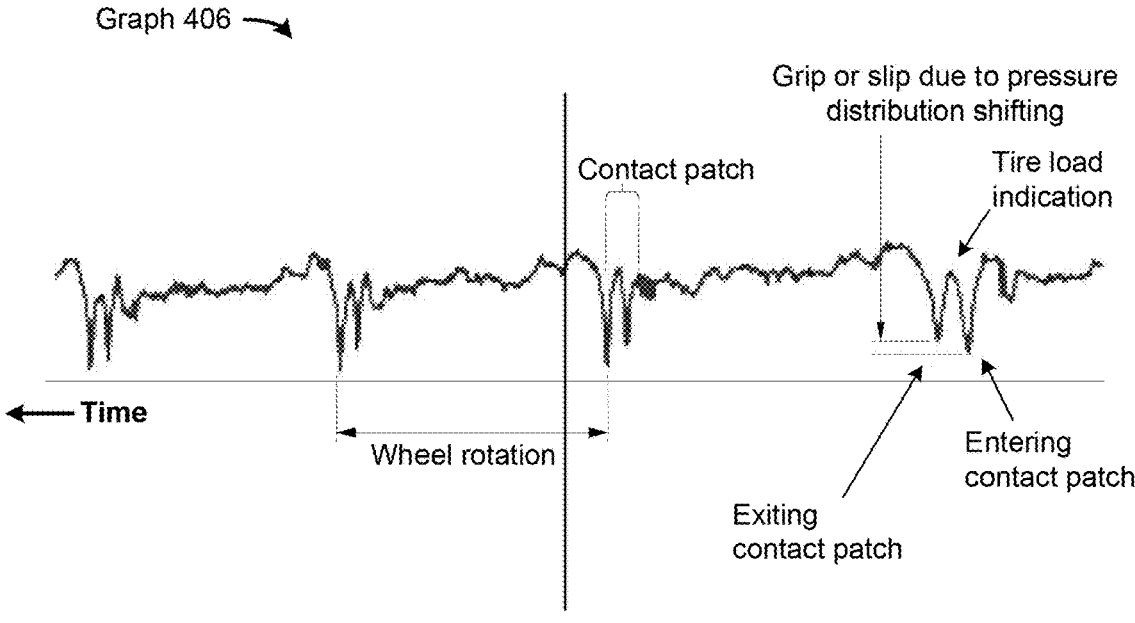

FIG. 4D shows a graph 406 illustrating sensor data (e.g., from the sensor 202 or the sensor 306) during operation of a tire (e.g., the tire 302). Notably, time progresses from right to left in the graph 406 (as indicated by the time arrow). The graph 406 shows detection of tire deformation strain as a tire rolls on a surface (e.g., as the sensor enters and exits a contact patch). As illustrated by the graph 406, the local minimum associated with entering the contact patch is lower than the local minimum associated with exiting the contact patch, which indicates a greater traction force when exiting the contact patch (and a greater braking force when entering the contact patch). A lower local minimum in the graph 406 indicates that the tire is slowing down as compared to a higher local minimum. The peak between the local minimums in the contact patch corresponds to an amount of load on the tire. In some embodiments, a controller determines load distribution on a vehicle based on data from respective sensors on multiple wheels of the vehicle.

As illustrated in graph 406, various characteristics of the tire, vehicle, and surface conditions can be determined from the sensor data. The resistance of the sensor changes (e.g., increases) while it is in the contact patch (resulting in a decrease in voltage). As discussed previously, the changes in resistance can be used to determine wheel rotation, grip/slip, velocity, and the like.

Figure 5A:
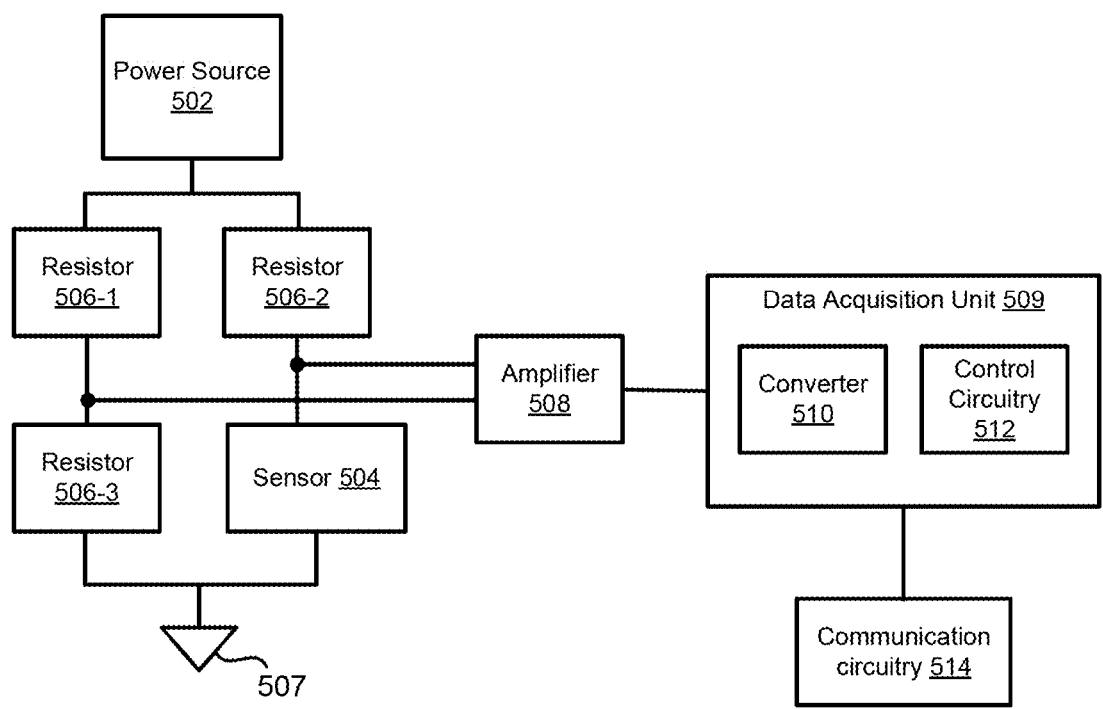
FIG. 5A illustrates an example system that includes a tire-mounted sensor in accordance with some embodiments.

FIG. 5A illustrates a system 500 that includes a tire-mounted sensor in accordance with some embodiments. The system 500 includes a power source 502 coupled to a sensor 504 (e.g., an instance of the sensor 202). In some embodiments, the power source 502 is, or includes, an energy harvesting component (e.g., a piezoelectric energy harvesting coupled to the tire). In some embodiments, the energy harvesting component includes an energy sensing component (e.g., the energy harvesting component also provides sensing of the tire, vehicle, and/or surface conditions). In some embodiments, the power source 502 comprises a battery and/or energy cell. In some embodiments, the power source 502 comprises a current source (e.g., a constant current source or an adaptive current source). In some embodiments, one or more parameters of the power source 502 are controllable by a control circuit (e.g., the control circuitry 512). The sensor 504 in FIG. 5A is coupled in a resistor network with resistors 506 (e.g., resistors 506-1, 506-2, and 506-3). In some embodiments, the power source 502 is coupled to the sensor 504 without the resistor network (e.g., is connected directly to the sensor 504). In some embodiments, the power source 502 is coupled to multiple sensors (e.g., multiple sensors of the same type or different types).

In some embodiments, one or more of the resistors 506 comprises a variable resistor (e.g., adjustable by the control circuitry 512 based on operating conditions of the system 500). In some embodiments, one or more of the resistors 506 (e.g., the resistor 506-3) is replaced with a second sensor (e.g., a second sensor 504 arranged at a different position on a same tire as sensor 504). For example, the second sensor may be used as a dummy gauge (e.g., for temperature compensation). In some embodiments, the resistors 506-1 and 506-2 are used as bridge balancing resistors. In some embodiments, the sensor 504 is arranged at a different position in the resistor network (e.g., the positions of the sensor 504 and the resistor 506-2 are swapped).

The resistor network is coupled to an amplifier 508 (e.g., a differential amplifier) and an electrical ground 507. In some embodiments, the resistor network (or the sensor 504) is coupled to an analog front end (e.g., including the amplifier 508). In some embodiments, the sensor 504 is coupled between the power source 502 and the amplifier 508. In some embodiments, the amplifier 508 is a non-differential amplifier. In some embodiments, the amplifier 508 is a signal conditioning amplifier. The output of the amplifier 508 in FIG. 5A is coupled to a data acquisition unit 509. The data acquisition unit 509 in FIG. 5A includes a converter 510 (e.g., an analog-to-digital converter) and control circuitry 512 (e.g., a microcontroller). In some embodiments, the data acquisition unit 509 includes a subset or superset of the components shown in FIG. 5A.

The system 500 includes communication circuitry 514 coupled to the data acquisition unit 509. In some embodiments, the data acquisition unit 509 includes the communication circuitry 514. In some embodiments, the communication circuitry 514 includes wireless communication component (e.g., configured to communicate with one or more remote devices via WiFi and/or Bluetooth protocols). In some embodiments, one or more of: the power source 502, the resistors 506, the amplifier 508, the data acquisition unit 509, the converter 510, the control circuitry 512, and the communication circuitry 514 are co-located with the sensor 504. In some embodiments, one or more of: the power source 502, the resistors 506, the amplifier 508, the data acquisition unit 509, the converter 510, the control circuitry 512, and the communication circuitry 514 are arranged on a wheel or rim. In some embodiments, the circuitry 210 includes one or more of: the amplifier 508, the data acquisition unit 509, the converter 510, the control circuitry 512, and the communication circuitry 514.

In some embodiments, the system 500 includes a controller communicatively coupled to multiple data acquisition units corresponding to multiple sensors. In some embodiments, the multiple sensors include multiple types of sensors (e.g., accelerometers, pressure sensors, strain sensors, image sensors, laser sensors, position sensors, moisture sensors, and/or other types of sensors). For example, a moisture sensor may be used to determine whether a moisture level within a tire meets one or more criteria. In some embodiments, the controller is coupled to a tire pressure monitoring component. In some embodiments, the controller is communicatively coupled to each data acquisition unit via a flexible connector and/or a wireless connection. In some embodiments, the system 500 is a telemetry system (e.g., configured to process sensing information from one or more sensors for various purposes, such as autonomous or semi-autonomous driving).

Figure 5B:
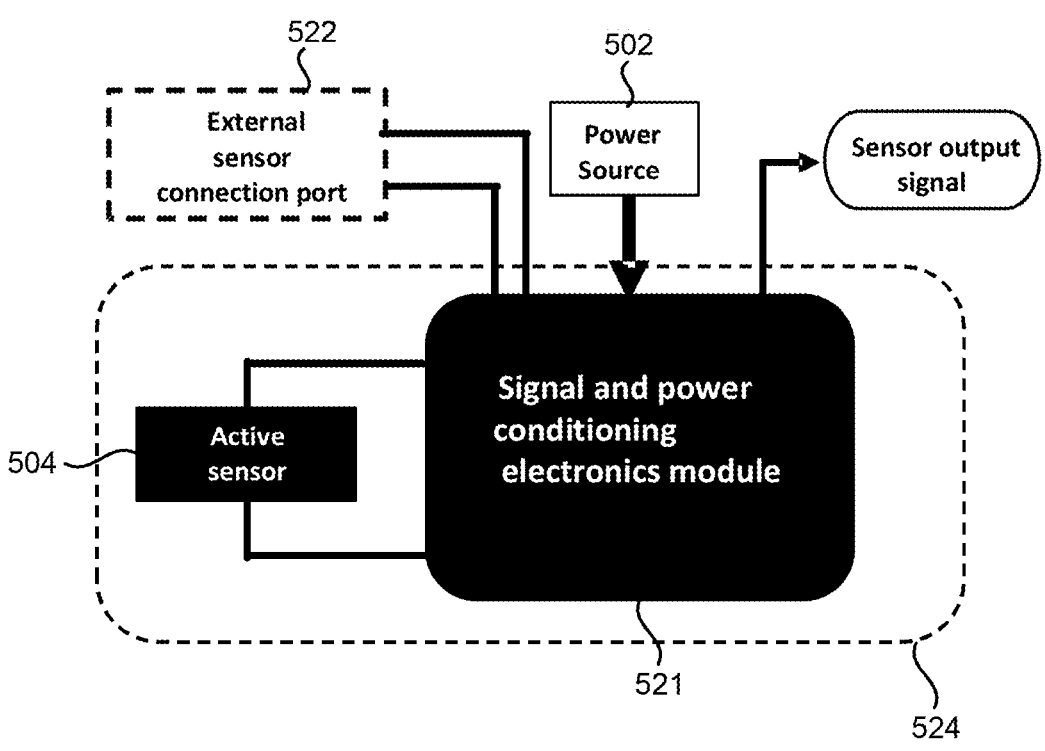
FIG. 5B illustrates another example system that includes a tire-mounted sensor in accordance with some embodiments.

FIG. 5B illustrates a system 520 that includes a tire-mounted sensor 504 in accordance with some embodiments. The system 520 includes the sensor 504, the power source 502, and a conditioning module 521. In some embodiments, the conditioning module 521 includes a resistor network, a voltage control component, a current control component, an analog front end, and/or other types of components. The conditioning module 521 in FIG. 5B may be coupled to an external sensor (e.g., a dummy sensor) via external sensor connection port 522. In some embodiments, the sensor 504 is an encapsulated single gauge sensor. For example, encapsulated in a protective layer such as an elastomer or polymer.

In some embodiments, the sensor 504 is encapsulated with the conditioning module 521 as indicated by dotted line 524.

Figure 5C:
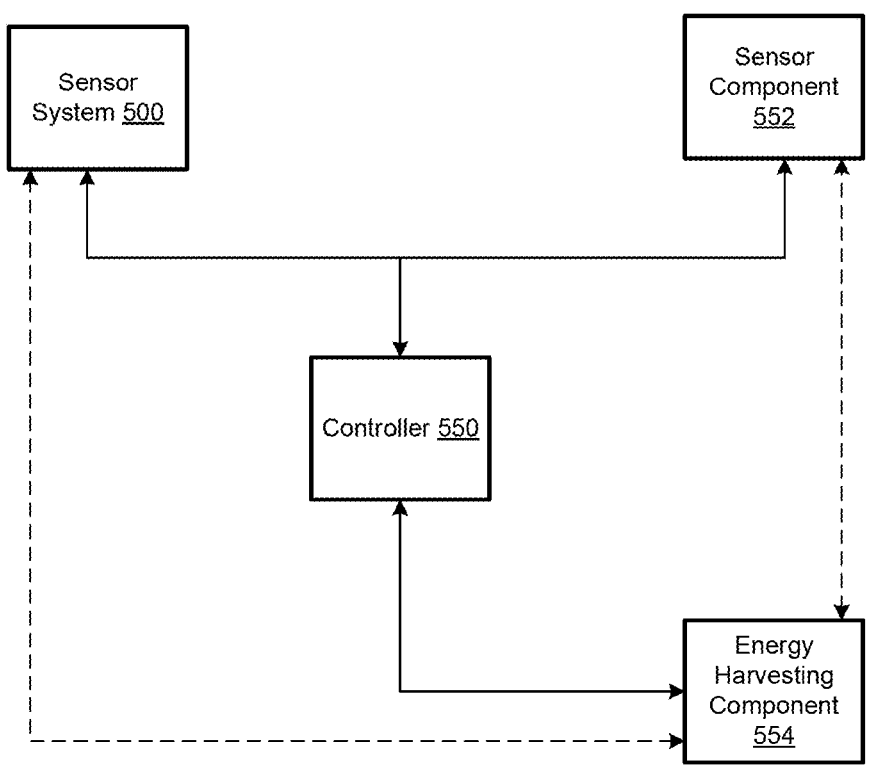
FIG. 5C illustrates an example system that includes multiple sensors in accordance with some embodiments.

FIG. 5C illustrates a system 540 that includes multiple sensors in accordance with some embodiments. The system 540 includes the sensor system 500 communicatively coupled to a controller 550. In some embodiments, the controller 550 comprises one or more processors, micropro- cessors, and/or other control circuitry. The controller 550 is communicatively coupled to a sensor component 552. In some embodiments, the controller 550 is communicatively coupled to one or more additional sensor components (e.g., different types of sensors and/or sensors arranged in differ- ent positions). The controller 550 is communicatively coupled to an energy harvesting component 554. In some embodiments, the energy harvesting component 554 sup- plies power to the controller 550, the sensor component 552, and/or the sensor system 500. In some embodiments, the energy harvesting component 554 provides energy sensing information to the controller 550. In some embodiments, the controller 550 aggregates data from the sensor system 500, the sensor component 552, and/or the energy harvesting component 554. In some embodiments, the controller 550 controls, or is in communication with, one or more vehicle stability control systems, such as ABS, TCS, ECS, and TPMS. In some embodiments, the controller 550 is com- municatively coupled to the other components via one or more flexible connectors and/or one or more wireless radios. In some embodiments, at least a portion of the flexible connectors are attached to an inner surface of a tire (e.g., are electrical connection strips applied to a surface of the tire). In some embodiments, at least a portion of the flexible connectors are embedded in the tire.

In some embodiments, the controller 550 is configured to determine a load distribution of a vehicle based on data from sensors on multiple tires. For example, the controller 550 may determine how load is distributed across multiple axles of a truck using data from sensors in multiple tires installed on the truck. In some embodiments, the controller 550 (and/or the control circuitry 512) is configured to determine a condition of a tire based on data from one or more sensors. For example, the controller may determine that a tire is punctured, worn, retread, and/or missing a portion based on data from one or more sensors attached to (or embedded within) the tire.

Additional details about the energy harvesting component and how the energy harvesting component may be disposed on a tire or wheel of a vehicle can be found in U.S. patent application Ser. No. 16/158,216 filed on Oct. 11, 2018, and titled "Rotating Wheel and an Energy Harvesting System," now issued as U.S. Pat. No. 11,325,432 on May 10, 2022, and in U.S. patent application Ser. No. 16/681,620 filed on Nov. 12, 2019 and titled "Smart Wheel Energy Harvester," now published as U.S. Patent Application No. 2021/ 0028725 (the "725 Patent Application") on Jan. 28, 2021, the contents of each which is incorporated by reference in its entirety for all purposes.

In some embodiments, brake input signals (e.g., from a brake pedal) are provided to a brake control system, which provides control signals to activate a brake actuator (for applying a brake) or deactivate the brake actuator (for disengaging the brake). In some embodiments, signals from one or more sensors (e.g., the sensor 202) are provided to the brake control system so that the brake control system provides modified control signals to the brake actuator. For example, while the brake control system provides control signals to the brake actuator (in accordance with the brake input signal indicating that an operator has pressed on the brake pedal), the brake control system may receive signals from the one or more sensors indicating that one or more wheels (or tires) are slipping and modify control signals provided to the brake actuator to initiate anti-lock braking operations (e.g., providing pulsed control signals) until signals indicating slipping are no longer received. In some embodiments, the brake control system receives signals from respective sensor(s) at multiple wheels (e.g., each wheel) of the vehicle. In some embodiments, the brake control system modifies each wheel individually based on the corresponding sensor signals (e.g., applies distinct anti- lock braking operations at each wheel).

In some embodiments, a vehicle motion control system provides control signals to the motor (e.g., based on brake input signals and/or accelerator input signals). In some embodiments, signals from one or more sensors (e.g., the sensor 202) are also provided to the vehicle motion control system, which modifies control signals provided to the motor based on the signals received from the one or more sensors. For example, the vehicle motion control system adjusts one or more cruise control settings based on the signals received from the one or more sensors. In some embodiments, a vehicle suspension system is adjusted based on the signals received from the one or more sensors. In some embodiments, the vehicle suspension system is adjusted based on a comparison of respective signals from sensors on respective wheels of the vehicle. For example, the vehicle stability and ride comfort are controlled sepa- rately based on the specific feedback signal(s) from each wheel. In some embodiments, the vehicle includes multiple motor drives, and each motor drive is (separately) adjusted based on feedback signal(s) from the wheels. For example, motion control is applied separately to each drive system based on the feedback signals from different wheels.

Figure 6:
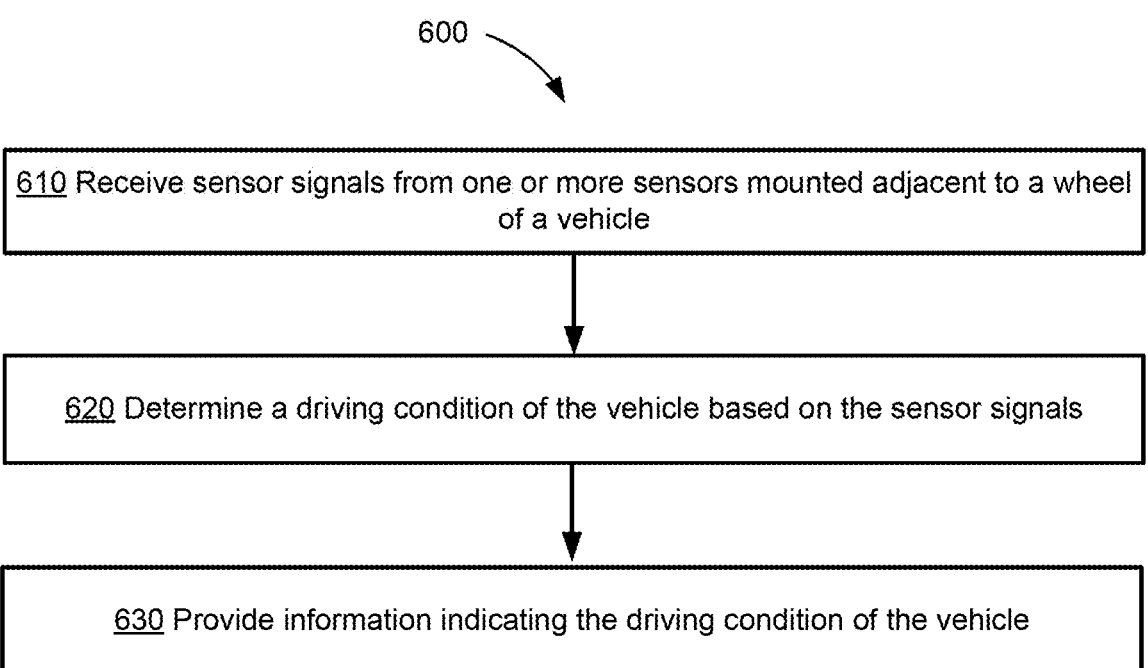
FIG. 6 is a flow diagram illustrating an example method of processing signals from one or more sensors mounted to a wheel of a vehicle in accordance with some embodiments.

FIG. 6 is a flow diagram illustrating a method 600 of processing signals from one or more sensors mounted to a wheel of a vehicle in accordance with some embodiments. In some embodiments, the method 600 is performed by a control circuit (e.g., one or more processors) mounted on the vehicle. For example, the method 600 may be performed by the circuitry 210.

The method 600 includes (610) receiving sensor signals one or more sensors (e.g., one or more flexible sensors, one or more conductive liquid sensors, one or more energy harvesters, one or more pressure sensors, one or more vibration sensors, and/or other types of sensors) mounted to a wheel (e.g., wheel 254) of a vehicle (e.g., vehicle 250).

In some embodiments, the sensor signals include a first set of sensor signals from a first sensor (e.g., the sensor 202) of the one or more sensors, and a second set of sensor signals are from a second sensor, distinct from the first sensor, of the one or more sensors. In some embodiments, the first sensor is located in a first radial direction on the wheel, and the second sensor is located in a second radial direction, distinct from the first radial direction, on the wheel. In some embodi- ments, the second radial direction is opposite to the first radial direction. In some embodiments, the second radial direction is offset from the first radial direction by an offset angle of at least 15 degrees. In some embodiments, the first sensor is arranged on a first wheel of the vehicle, and the second sensor is arranged on a second wheel of the vehicle, distinct from the first wheel. In some embodiments, the sensor signals include a first set of sensor signals from a first sensor of the one or more sensors over a first time period, and a second set of sensor signals from the first sensor of the one or more sensors over a second time period that is distinct from the first time period.

The method 600 includes (620) determining a driving condition (e.g., acceleration, deceleration, other vehicle events, road conditions, and/or load distribution) of the vehicle based on the sensor signals. In some embodiments, the method 600 includes obtaining a superposition of first and second sensor signals and determining the driving condition of the vehicle based on the superposition of the first and second sensor signals. In some embodiments, the method 600 includes obtaining a difference between the first and second sensor signals, and determining a driving condition of the vehicle based on the difference between the first and second sensor signals.

In some embodiments, the method 600 includes (630) providing information indicating the driving condition of the vehicle (e.g., to a driver and/or to a vehicle stability control system). For example, the information indicating the driving condition may be provided to one or more controllers of the vehicle. In some embodiments, the method 600 includes adjusting operation of a brake of the vehicle in accordance with the determined driving condition of the vehicle. In some embodiments, the method 600 includes adjusting operation of a motor of the vehicle in accordance with the determined driving condition of the vehicle.

In some embodiments, the method 600 includes monitoring tire information (e.g., strain changes within a wheel rotation) and determining tire health information based on changes in the tire information. For example, statistical data over time may be used to detect tire health deterioration (e.g., punctures, wear, tear, and/or stiffening) and/or tire anomalies. In some embodiments, the tire information is monitored during a particular operating condition (e.g., to determine differences between two events occurring in the same operating conditions).

FIG. 7A is a flow diagram illustrating a method 700 of manufacturing a tire assembly in accordance with some embodiments. The method 700 includes (702) obtaining a first substrate of tire composition (e.g., rubber). In some embodiments, the tire composition comprises a tire material that has not been vulcanized (e.g., prior to vulcanization). In some embodiments, the first substrate is molded (or otherwise shaped) into the shape of a tire.

The method 700 includes (704) adjusting a composition of a liquid sensor based on one or more characteristics of the first substrate. In some embodiments, adjusting the composition of the liquid sensor includes adjusting one or more of: a surface tension, a viscosity, and a resistivity of the liquid sensor. In some embodiments, the composition of a liquid sensor is adjusted based on the one or more characteristics of the first substrate and an application process for applying the liquid sensor to the first substrate. For example, the composition of the liquid sensor is adjusted based on whether the liquid sensor is to be applied to the first substrate via a stencil print, a screen print, an intaglio print, a spray print, and/or a stamp print. In some embodiments, the composition of the liquid sensor is adjusted by applying one or more additives. For example, the one or more additives include one or more particles (e.g., nano particles) and/or a resin (e.g., a silicone resin). For example, the nano particles may be ceramic, metallic, and/or polymer particles. In some embodiments, a size of the one or more additives is in a range of 10 nm to 1,000 nm.

The method 700 includes (706) coupling one or more electrical connectors to the liquid sensor. In some embodiments, the one or more electrical connectors are flexible connectors. In some embodiments, the one or more electrical connectors are mesh connectors. In some embodiments, the one or more electrical connectors comprise a flexible solid electrode. In some embodiments, the electrical connectors are coupled to the liquid sensor prior to applying the liquid sensor to the first substrate, and the electrical connectors are coupled to the first substrate after coupling with the liquid sensor. In some embodiments, the electrical connectors are coupled to the first substrate prior to applying the liquid sensor to the first substrate, and the electrical connectors are coupled to the liquid sensor after coupling with the first substrate. In some embodiments, the electrical connectors are applied to a surface of the first substrate (e.g., via an adhesive, a painting process, or a deposition process).

The method 700 includes (708) applying the liquid sensor to the first substrate. In some embodiments, the liquid sensor is applied to the first substrate via a stencil print process, a screen print process, an intaglio print process, a spray print process, and/or a stamp print process.

The method 700 includes (710) applying a protective layer to the liquid sensor. In some embodiments, the protective layer comprises a liquid silicone-based polymer, an elastomer, and/or a PDMS. In some embodiments, applying the protective layer comprises covering the liquid sensor with a liquid protective layer. In some embodiments, applying the protective layer comprises pouring the protective layer (e.g., to mold to the liquid sensor). In some embodiments, applying the protective layer comprises at least partially solidify (e.g., quasi-solidify) the protective layer. In some embodiments, applying the protective layer comprises hardening/curing the protective layer (e.g., before or after applying a second substrate). In some embodiments, the protective layer is bonded to the first substrate via a plasma or molecular bonding process. In some embodiments, the protective layer is composed of a same material as the first substrate.

In some embodiments, the method 700 includes (712) applying a second substrate of tire composition to the first substrate. In some embodiments, the second substrate is coupled to the first substrate, the protective layer, and/or the liquid sensor. In some embodiments, one or more other components are applied to the first substrate (e.g., a battery, a power module, a circuit, and/or other electronic components). For example, the battery may be a solid-state Lithium-ion battery. In some embodiments, at least a subset of the one or more other components are applied to a third substrate (e.g., a PDMS substrate) that is attached to the first substrate.

The method 700 includes (714) integrating the first substrate and the liquid sensor in a tire. In some embodiments, integrating the first substrate and the liquid sensor in the tire comprises applying pressure and/or heat to the first substrate and the tire. For example, a pressure heat molding process is applied to the first substrate and/or the tire. In some embodiments, integrating the first substrate and the liquid sensor in the tire comprises applying a vulcanization process. In some embodiments, the method includes hardening the tire assembly (e.g., a multi-layer substrate structure). In some embodiments, a process for hardening the first substrate is based on a composition of the first substrate. In some embodiments, integrating the first substrate and the liquid sensor in the tire includes curing the protective layer. In some embodiments, the vulcanization process integrates the liquid sensor and the first substrate.

In some embodiments, the method 700 includes, after integrating the first substrate and the liquid sensor in the tire, attaching one or more electronic components to the tire assembly. For example, the one or more electronic components may include a power module, an energy harvesting component, and controller, and/or communication circuitry.

In some embodiments, the method 700 includes attaching a puncture sensor to the first substrate (e.g., after hardening the first substrate). For example, the puncture sensor may include an electrically conductive layer between two or more electrically insulating layers. In some embodiments, attaching the puncture sensor includes spraying a layer of conductive material on a surface of the tire assembly (e.g., on a surface of the first substrate or on an insulating layer applied to the first substrate). In some embodiments, the puncture sensor comprises a conductive paint (e.g., applied on an insulating layer (e.g., an insulating foam). In some embodiments, the puncture sensor is communicatively coupled to control circuitry (e.g., the circuitry 210).

Figure 7B:
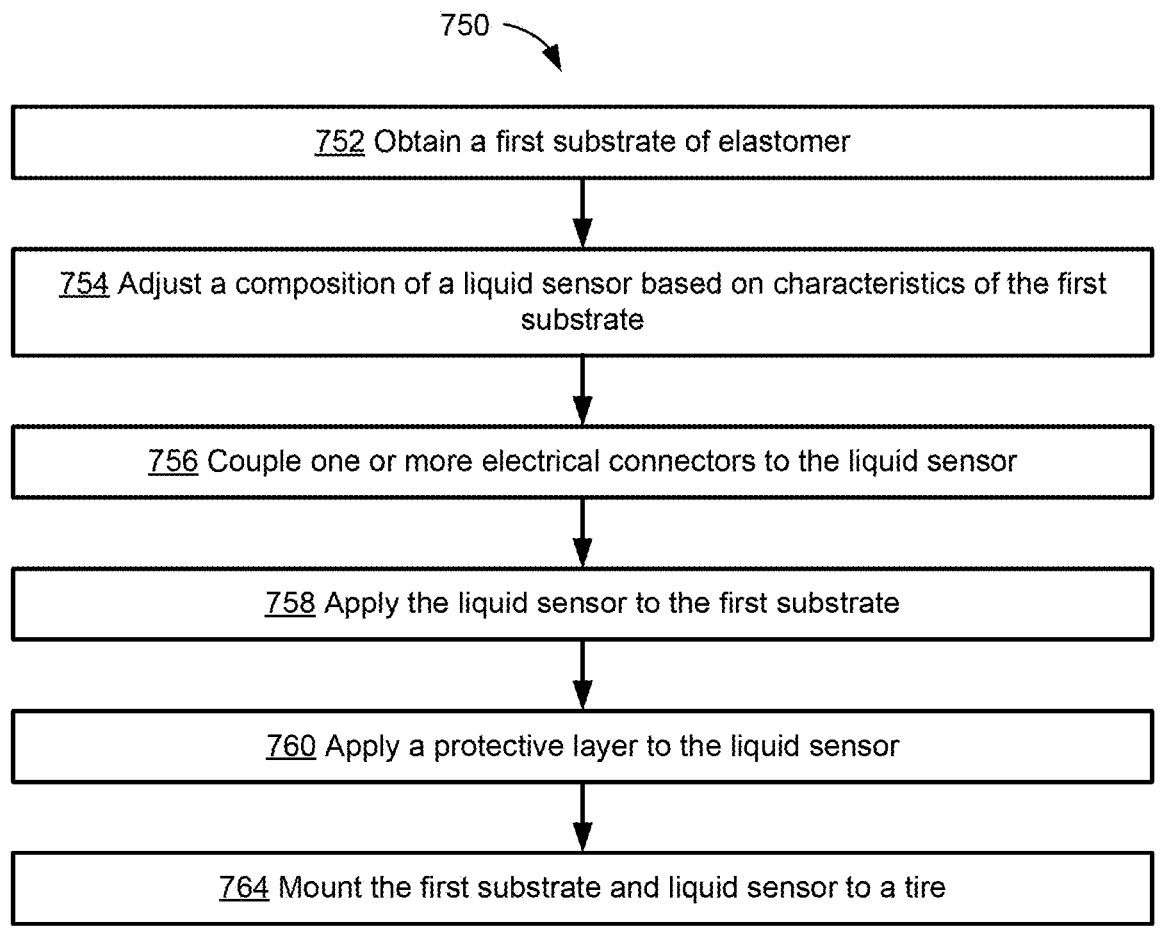
FIG. 7B is a flow diagram illustrating another example method of manufacturing a tire assembly in accordance with some embodiments.

FIG. 7B is a flow diagram illustrating a method 750 of manufacturing a tire assembly in accordance with some embodiments. The method 750 includes (752) obtaining a first substrate of elastomer (e.g., rubber). In some embodiments, the elastomer comprises a tire material that has not been vulcanized (e.g., prior to vulcanization). In some embodiments, the first substrate is molded (or otherwise shaped) to correspond to the shape of a tire (e.g., to better mount to a tire). In some embodiments, the first substrate is composed of a silicon-based polymer, an elastomer, and/or PDMS. In some embodiments, the first substrate is composed of a material that has a mechanical impedance that matches a tire material.

The method 750 includes (754) adjusting a composition of a liquid sensor based on one or more characteristics of the first substrate. In some embodiments, adjusting the composition of the liquid sensor includes adjusting one or more of: a surface tension, a viscosity, and a resistivity of the liquid sensor. In some embodiments, the composition of a liquid sensor is adjusted based on the one or more characteristics of the first substrate and an application process for applying the liquid sensor to the first substrate. For example, the composition of the liquid sensor is adjusted based on whether the liquid sensor is to be applied to the first substrate via a stencil print, a screen print, an intaglio print, a spray print, and/or a stamp print. In some embodiments, the composition of the liquid sensor is adjusted by applying one or more additives. For example, the one or more additives include one or more particles (e.g., nano particles) and/or a resin (e.g., a silicone resin). For example, the nano particles may be ceramic, metallic, and/or polymer particles. In some embodiments, a size of the one or more additives is in a range of 10 nm to 1,000 nm.

The method 750 includes (756) coupling one or more electrical connectors to the liquid sensor. In some embodiments, the one or more electrical connectors are flexible connectors. In some embodiments, the one or more electrical connectors are mesh connectors. In some embodiments, the one or more electrical connectors comprise a flexible solid electrode. In some embodiments, the electrical connectors are coupled to the liquid sensor prior to applying the liquid sensor to the first substrate, and the electrical connectors are coupled to the first substrate after coupling with the liquid sensor. In some embodiments, the electrical connectors are coupled to the first substrate prior to applying the liquid sensor to the first substrate, and the electrical connectors are coupled to the liquid sensor after coupling with the first substrate. In some embodiments, the electrical connectors are applied to a surface of the first substrate (e.g., via an adhesive, a painting process, or a deposition process). In some embodiments, the electrical connectors are applied to a surface of the tire and coupled to the liquid sensor after the liquid sensor is mounted to the tire.

The method 750 includes (758) applying the liquid sensor to the first substrate. In some embodiments, the liquid sensor is applied to the first substrate via a stencil print process, a screen print process, an intaglio print process, a spray print process, and/or a stamp print process.

The method 750 includes (760) applying a protective layer to the liquid sensor. In some embodiments, the protective layer comprises a liquid silicone-based polymer, an elastomer, and/or a PDMS. In some embodiments, applying the protective layer comprises covering the liquid sensor with a liquid protective layer. In some embodiments, applying the protective layer comprises pouring the protective layer (e.g., to mold to the liquid sensor). In some embodiments, applying the protective layer comprises at least partially solidify (e.g., quasi-solidify) the protective layer. In some embodiments, applying the protective layer comprises hardening/curing the protective layer (e.g., before or after applying a second substrate). In some embodiments, the protective layer is bonded to the first substrate via a plasma or molecular bonding process. In some embodiments, the protective layer is composed of a same material as the first substrate.

The method 750 includes (764) mounting the first substrate and the liquid sensor to a tire. In some embodiments, the first substrate and/or liquid sensor mounted to the tire via application of a glue, an epoxy, Polyamide/nylon, and/or silicone. In some embodiments, the first substrate and/or liquid sensor is mounted to the tire after the tire is vulcanized.

In some embodiments, the method 750 includes, after mounting the first substrate and the liquid sensor to the tire, attaching one or more electronic components to the tire assembly. For example, the one or more electronic components may include a power module, an energy harvesting component, and controller, and/or communication circuitry.

In light of the above disclosure certain embodiments are described below.

(A1) In one aspect, some embodiments include a tire assembly that comprises: (i) a vehicle tire (e.g., the tire 302), (ii) a substrate (e.g., the substrate 204) adapted to deform in accordance with deformation of the vehicle tire; and (iii) a set of conductive liquid sensors (e.g., the liquid electrode 102 and/or 104) coupled to the vehicle tire via the substrate, where an electrical resistance of the set of conductive liquid sensors changes in accordance with deformation of the substrate. The set of conductive liquid sensors may include one or more sensors. The vehicle tire may be configured for use with an automobile, a motorcycle, or a bicycle. In some embodiments, the set of conductive liquid sensors include the sensor described below in any of B1-B8.

(A2) In some embodiments of A1, the tire assembly further includes control circuitry (e.g., the circuitry 210, the control circuitry 512, and/or the controller 550) coupled to the set of conductive liquid sensors, and the set of conductive liquid sensors are configured to provide road contact information for the vehicle tire to the control circuitry. For example, while the tire is in use (e.g., the vehicle is in motion), the sensors are configured to provide road contact information to the control circuitry in real time. In some embodiments, the control circuitry is electrically coupled to the sensors via one or more signal wires (e.g., the electrical connectors 206). In some embodiments, the control circuitry is attached to the vehicle tire (e.g., an interior surface of the tire). In some embodiments, the control circuitry is attached to a wheel or rim for the tire. In some embodiments, the control circuitry is wireless coupled to the sensors (e.g., via Wi-Fi or BLE). In some embodiments, the sensors are coupled to a power source (e.g., the power source 502) and/or a wireless communication module (e.g., the communication circuitry 514). In some embodiments, the sensors are coupled to an input of an amplifier (e.g., the amplifier 508) and/or a data acquisition unit (e.g., including an analog to digital converter and/or a microcontroller) and the control circuitry is coupled to an output. In some embodiments, the control circuitry is configured to determine tire, vehicle, and/or surface conditions based on information from the set of conductive liquid sensors. For example, the control circuitry may be configured to determine a traction force on the tire, a lateral force on the tire, a vertical force on the tire, a load on the tire, a temperature of the tire (e.g., a sidewall temperature), a wear of the tire (e.g., a thickness of the tire), a vehicle speed, a turning angle of the vehicle, tire grip/slip, one or more surface conditions, and/or one or more braking conditions. For example, a load on the tire may be determined based on measured strain from a side wall of the tire. As another example, contact patch force may be determined by measuring strain on the tire (e.g., the tire inner surface) in various strain orientations.

(A3) In some embodiments of A2, the control circuitry is configured to determine one or more vehicle characteristics based on the electrical resistance of the set of conductive liquid sensors. In some embodiments, the control circuitry is configured to determine one or more vehicle characteristics based on one or more of: an electrical resistance of the set of conductive liquid sensors, a capacitance of the set of conductive liquid sensors, and an inductance of the set of conductive liquid sensors. In some embodiments, the one or more vehicle characteristics include a vehicle load. In some embodiments, the control circuitry is configured to determine a bending angle based on data output by the sensors. In some embodiments, the control circuitry is configured to determine a traction force, a lateral force, a tire pressure, a tire wear, a tire grip, braking conditions, a vehicle load, a vehicle speed, a turn angle, and/or contact patch details using the data from the sensors.

(A4) In some embodiments of any of A1-A3, the substrate is mechanical impedance matched with the vehicle tire. For example, the primary strain-sensitive structure in the sensor is the substrate/polymer body which is impedance matched substantially matched (e.g., matched within 10%, 5%, or 1%) to the tire.

(A5) In some embodiments of any of A1-A4, the set of conductive liquid sensors have a thermal coefficient of expansion that is substantially matched (e.g., within 10%, 5%, or 1%) with a thermal coefficient of expansion of the vehicle tire.

(A6) In some embodiments of any of A1-A5, the set of conductive liquid sensors are attached to an interior or exterior surface of the vehicle tire. For example, each sensor is adhered or bonded to a surface of the tire. In some embodiments, a sensor is attached to a tread region or side-wall region of the tire.

(A7) In some embodiments of A6, the tire assembly further includes an adhesive (e.g., the adhesive 318) or bonding agent adapted to attach the set of conductive liquid sensors to the vehicle tire, where a coefficient of thermal expansion (CTE) for the adhesive or bonding agent is substantially matched (e.g., within 10%, 5%, or 1%) with a CTE for the vehicle tire. For example, the materials of the adhesive or bonding agents are selected to be compatible with the elastomer sensor substrate and the tire materials as well as the CTE and the stiffness modulus are matched with the tire. In some embodiments, a mechanical impedance of the adhesive/bonding agent is matched to a mechanical impedance of the tire to prevent energy dissipation at the attachment interface.

(A8) In some embodiments of any of A1-A5, the set of conductive liquid sensors are embedded within the vehicle tire. For example, each sensor is embedded inside the structure of the tire. In some embodiments, the sensors are embedded within a material matrix of the tire.

(A9) In some embodiments of any of A1-A8, the set of conductive liquid sensors are adapted to elongate to match changes in a shape of the vehicle tire. For example, the sensors stretch in all dimensions and follow the tire movement reliably throughout an entire tire operating sequence and in storage conditions. In some embodiments, the set of conductive liquid sensors conform to a shape of the vehicle tire. For example, each liquid sensor is able to conform to the shape of the surface profile and the movements of the tire.

(A10) In some embodiments of any of A1-A9, the set of conductive liquid sensors are composed of a conductive liquid metal (e.g., composed of Gallium, Indium, and/or Bismuth). For example, a conductive liquid metal is used by detecting electrical resistance changes due to the overall length change caused by the change of tire profile under various load conditions.

(A11) In some embodiments of A10, the conductive liquid metal is an alloy that is liquid at room temperature. For example, the alloy may be an alloy of gallium, indium, and tin. In some embodiments, a different conductive liquid metal is used in addition to, or alternatively to, the alloy (e.g., a metal that is liquid between −15 Celsius (C) to 80 C). In some circumstances, the alloy has a melting temperature at −19 C and boiling point above 1300 C. In some embodiments, the conductive liquid metal is adapted to be liquid at tire operating conditions.

(A12) In some embodiments of A10 or A11, the conductive liquid metal has a self-healing property while in liquid form. For example, liquid metal has a self-healing property when the temperature is above its freezing temperature such that the sensing electrode can reflow and reconnect itself (A13) In some embodiments of A10 or A12, the conductive liquid metal has a stretchability of at least 100%. For example, a resistance of the conductive liquid metal is proportional to percent elongation up through 100 percent elongation. For example, the liquid metal has no mechanical strength in liquid phase and its stretchability is greater than 100%, thus it does not induce a mechanical resistance that affects the sensing function or strength transfer at the interface between sensor and tire. In various embodiments, the conductive liquid metal has a stretchability of at least 5%, 10%, 20%, 50%, 60%, and/or 80%. In some embodiments, the conductive liquid metal is adapted to have a stretchability that is at least equal to a stretchability of a tire material.

(A14) In some embodiments of any of A1-A13, the set of conductive liquid sensors are deformable with an elongation and/or contraction of at least 30%. For example, the sensors are stretchable and deformable with elongation greater than 30% for pneumatic tire applications.

(A15) In some embodiments of any of A1-A14, each sensor of the set of conductive liquid sensors comprises a liquid metal sensing electrode (e.g., the liquid electrode 102 or 104). For example, liquid metal can withstand long term cyclic motion without mechanical strength reduction, which avoids fracture failure due to fatigue (e.g., suffered by rigid materials). A liquid metal sensing electrode is able to stretch or compress as well as to conform the movement of a tire. Furthermore, liquid metal can have a self-healing property when the temperature is above its freezing temperature such that the sensing electrode can reflow and reconnect itself (A16) In some embodiments of A15, an electrical resistance of the liquid metal sensing electrode changes proportional to the deformation of the substrate (e.g., as illustrated in graph 400). For example, the electrical resistance of the sensing liquid metal pattern proportionally increases/decreases according to the deformation of the elastomer substrate/host.

(A17) In some embodiments of any of A1-A16, the substrate is a polymer substrate. For example, the liquid metal sensing electrode is allowed to stretch or compress as well as to conform to the movement of a tire. In some embodiments, the liquid metal is a strain-less liquid electrode and follows the displacement of the polymer substrate in all 3 dimensions. For example, each sensor is an elastomer patch with a liquid metal pattern embedded within it.

(A18) In some embodiments of A17, the polymer substrate has a mechanical stiffness that matches a stiffness modulus of the vehicle tire. For example, the mechanical stiffness of the host elastomer for the liquid metal is adjusted to match the stiffness modulus of a tire. In some embodiments, a CTE of the polymer substrate is matched with a CTE of the vehicle tire.

(A19) In some embodiments of any of A1-A18, the set of conductive liquid sensors are configured to have an output (e.g., change in resistance) that is linear with a percentage of elongation of the set of conductive liquid sensors.

(A20) In some embodiments of any of A1-A19, the tire assembly further includes: (i) a tire pressure sensor configured to sense a pressure of the vehicle tire; and (ii) control circuitry coupled to the set of conductive liquid sensors and the tire pressure sensor, where the control circuitry is configured to determine a tire load based on data from the tire pressure sensor and the set of conductive liquid sensors.

(A21) In some embodiments of any of A1-A20, the tire includes an inside surface, an outside surface opposite to the inside surface, and a tire bead region; and the tire assembly includes one or more electrical conductors extending from the inside surface of the tire to at least the tire bead region. In some embodiments, the tire assembly includes one or more electrical connector assemblies embedded at least partially in the tire. In some embodiments, a wheel assembly includes a wheel; any tire assembly described herein and mounted on the wheel; an energy harvester mounted on the wheel; and one or more electrical components electrically connected to the energy harvester via one or more electrical conductors.

(B1) In accordance with some embodiments, a sensor (e.g., the sensor 202) includes a flexible substrate (e.g., the substrate 204) that is mechanically impedance matched (e.g., within 10%, 5%, or 1%) with a tire material. In some embodiments, the sensor is a stretchable sensor. In some embodiments, the sensor is a flexible sensor. In some embodiments, the sensor is a strain-less sensor.

(B2) In some embodiments of B1, the sensor is a stretchable and deformable sensing device (e.g., with an elongation of more than 30%). In some embodiments, the sensor is composed of an elastomer (e.g., rubber) and/or a polymer (e.g., PDMS).

(B3) In some embodiments of B1 or B2, the sensor includes a flexible electrode (e.g., a conductive liquid electrode). In some embodiments, the flexible electrode is adapted to withstand the cyclic motion of a rotating wheel (e.g., without strength reduction due to material fatigue which can cause fracture of the sensing electrode and sensor failure). In some embodiments, the flexible electrode (e.g., the electrode 102 or 104) is embedded in and/or attached to the flexible substrate.

(B4) In some embodiments of any of B1-B3, the flexible substrate is an elastomer substrate. In some embodiments, the elastomer substrate has a mechanical impedance and/or CTE that matches (e.g., within 10%, 5%, or 1%) a mechanical impedance and/or CTE of a tire composite material (e.g., so that the elastomer substrate does not affect the sensitivity of the sensing function and to prevents sensor failure due to being over stressed).

(B5) In some embodiments of any of B1-B4, the sensor includes an adhesive to attach the sensor to a tire material. In some embodiments, the mechanical impedance and/or the CTE of the adhesive (or bonding agent) is matched (e.g., within 10%, 5%, or 1%) with the substrate and the tire materials. As a result, there is less energy dissipation to affect sensor sensitivity at the material interface and the sensing system is less likely to fail due to being overstressed.

(B6) In some embodiments of any of B1-B5, the sensor includes biaxial sensing components (e.g., portions 106 in FIG. 1B). For example, the sensor is used to monitor a one or more directions of surface deformation and/or strain.

(B7) In some embodiments of any of B1-B6, the sensor is configured to sense surface deformation of a tire with minimal (e.g., zero) movement of the vehicle. For example, a controller is configured to measure resistance change of the sensor in the tire due to a change in contact patch length with increasing load in a stationary vehicle. In some embodiments, minimal movement of the vehicle includes less than five full rotations of a tire of the vehicle. In some embodiments, minimal movement of the vehicle includes having the vehicle travel a total distance of less than one mile for generating the signal. In some embodiments, minimal movement of the vehicle includes having the vehicle travel less than 25 miles per hour.

(B8) In some embodiments of any of B1-B7, the substrate is composed of a rubber (e.g., a tire rubber) and/or a polymer. In some embodiments, the substrate is an elastomer substrate. In some embodiments, the substrate and/or the liquid electrode is screen printed, stamped, sprayed, stenciled, 3D printed, and/or glued to a tire (e.g., the tire 208).

(C1) In accordance with some embodiments, a method (e.g., the method 700) of manufacturing a tire assembly (e.g., the tire assembly of any of A1-A21 above)

includes: (i) obtaining a first substrate of tire material (e.g., rubber composition); (ii) applying a liquid sensor (e.g., the sensor 202) to the first substrate; and (iii) hardening or setting the first substrate.

(C2) In some embodiments of C1, the liquid sensor is composed of liquid metal. In some embodiments, the liquid sensor is the sensor described above in any of B1-B8.

(C3) In some embodiments of C1 or C2, the method further includes, prior to applying the liquid sensor to the first substrate, adjusting one or more properties of the liquid sensor. In some embodiments, adjusting the one or more properties comprises adjusting a composition of the liquid sensor (e.g., by adding particles or resin). In some embodiments, adjusting the one or more properties of the liquid sensor includes adjusting one or more of: a surface tension, a viscosity, and a resistivity of the liquid sensor. In some embodiments, the one or more properties of the liquid sensor are adjusted based on the one or more characteristics of the first substrate and/or a selected application process for applying the liquid sensor to the first substrate. In some embodiments, one or more properties of the liquid sensor are adjusted after the liquid sensor is applied to the first substrate. For example, adjusting the one or more properties may include adjusting thermal characteristics of the liquid sensor to be similar to the tire material for use in automotive environments. As another example, adjusting the one or more properties may include adjusting a stiffness of the liquid sensor to match an operating stiffness of the tire material.

(C4) In some embodiments of any of C1-C3, the method further includes coupling one or more electrical connectors (e.g., the electrical connectors 206) to the liquid sensor. In some embodiments, the electrical connectors are flexible connectors. In some embodiments, the electrical connectors are mesh connectors. In some embodiments, the electrical connectors are at least partially embedded in a substrate of the sensor and/or the first substrate. In some embodiments the electrical connectors are attached to a surface of the first substrate (e.g., printed on or adhered to the first substrate).

(C5) In some embodiments of any of C1-C4, the method further includes applying a protective layer (e.g., a layer of PDMS) to the liquid sensor. In some embodiments, the protective layer is applied to the liquid sensor after the liquid sensor is applied to the first substrate. In some embodiments, the protective layer is coated on the liquid sensor and then cured and/or set.

(C6) In some embodiments of any of C1-05, the method further includes applying a second substrate of tire material to the first substrate. In some embodiments, the second substrate is attached to the first substrate after the liquid sensor is applied to the first substrate.

(C7) In some embodiments of any of C1-C6, hardening or setting the first substrate comprises applying a vulcanization process to the first substrate. In some embodiments, the vulcanization process is applied to the tire assembly. In some embodiments, the vulcanization process is applied after a protective layer has been applied (and optionally cured) to the liquid sensor.

(C8) In some embodiments of any of C1-C7, the method further includes integrating one or more electronic components with the first substrate. For example, one or more electronic components are applied to the first substrate and electrically coupled to the liquid sensor. In some embodiments, the one or more electronic components include a battery, a power module, readout circuitry, control circuitry, and/or communication circuitry.

(C9) In some embodiments of any of C1-C8, applying the liquid sensor to the first substrate comprises applying the liquid sensor via a stencil print process, a screen print process, an intaglio print process, a spray print process, and/or a stamp print process. For example, the liquid metal may be sprayed (atomized), screen printed, or pad transfer printed on a (e.g., polymer) substrate surface.

It will be understood that, although the terms first, second, etc. may be used herein to describe various elements, these elements should not be limited by these terms. These terms are only used to distinguish one element from another. For example, a first array could be termed a second array, and, similarly, a second array could be termed a first array, without departing from the scope of the various described embodiments. The first array and the second array are both arrays, but they are not the same array.

The terminology used in the description of the embodiments herein is for the purpose of describing particular embodiments only and is not intended to be limiting of the scope of claims. As used in the description and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The foregoing description, for purpose of explanation, has been described with reference to specific embodiments. However, the illustrative discussions above are not intended to be exhaustive or to limit the scope of claims to the precise forms disclosed. Many modifications and variations are possible in view of the above teachings. The embodiments were chosen and described in order to best explain the principles of the various described embodiments and their practical applications, to thereby enable others skilled in the art to best utilize the principles and the various described embodiments with various modifications as are suited to the particular use contemplated.

What is claimed is:

1. A tire assembly, comprising:
a vehicle tire;
a substrate adapted to deform in accordance with deformation of the vehicle tire; and
a set of conductive liquid sensors coupled to the vehicle tire via the substrate, wherein an electrical resistance of the set of conductive liquid sensors changes in accordance with deformation of the substrate.

2. The tire assembly of claim 1, further comprising control circuitry coupled to the set of conductive liquid sensors, wherein the set of conductive liquid sensors are configured to provide road contact information for the vehicle tire to the control circuitry.

3. The tire assembly of claim 2, wherein the control circuitry is configured to determine one or more vehicle characteristics based on the electrical resistance of the set of conductive liquid sensors.

4. The tire assembly of claim 1, wherein the substrate is mechanical impedance matched with the vehicle tire.

5. The tire assembly of claim 1, wherein the set of conductive liquid sensors have a thermal coefficient of expansion that is matched with a thermal coefficient of expansion of the vehicle tire.

6. The tire assembly of claim 1, wherein the set of conductive liquid sensors are attached to an interior or exterior surface of the vehicle tire.

7. The tire assembly of claim 6, further comprising an adhesive or bonding agent adapted to attach the set of conductive liquid sensors to the vehicle tire, wherein a coefficient of thermal expansion (CTE) for the adhesive or bonding agent is matched with a CTE for the vehicle tire.

8. The tire assembly of claim 1, wherein the set of conductive liquid sensors are embedded within the vehicle tire.

9. The tire assembly of claim 1, wherein the set of conductive liquid sensors are adapted to elongate to match changes in a shape of the vehicle tire.

10. The tire assembly of claim 1, wherein the set of conductive liquid sensors are composed of a conductive liquid metal.

11. The tire assembly of claim 10, wherein the conductive liquid metal is an alloy that is liquid at room temperature.

12. The tire assembly of claim 10, wherein the conductive liquid metal has a self-healing property while in liquid form.

13. The tire assembly of claim 10, wherein the conductive liquid metal has a stretchability of at least 10%.

14. The tire assembly of claim 1, wherein the set of conductive liquid sensors are deformable with an elongation of at least 30%.

15. The tire assembly of claim 1, wherein each sensor of the set of conductive liquid sensors comprises a liquid metal sensing electrode.

16. The tire assembly of claim 15, wherein an electrical resistance of the liquid metal sensing electrode changes proportional to the deformation of the substrate.

17. The tire assembly of claim 1, wherein the substrate is a polymer substrate.

18. The tire assembly of claim 17, wherein the polymer substrate has a mechanical stiffness that matches a stiffness modulus of the vehicle tire.

19. The tire assembly of claim 1, wherein the set of conductive liquid sensors are configured to have an output that is linear with a percentage of elongation of the set of conductive liquid sensors.

20. The tire assembly of claim 1, further comprising:

a tire pressure sensor configured to sense a pressure of the vehicle tire; and control circuitry coupled to the set of conductive liquid sensors and the tire pressure sensor, wherein the control circuitry is configured to determine a tire load based on data from the tire pressure sensor and the set of conductive liquid sensors.

* * * * *